(12) United States Patent
Zand et al.

(10) Patent No.: US 11,994,604 B2
(45) Date of Patent: *May 28, 2024

(54) SYSTEM AND METHODS FOR IMPROVING SECURE PHASE-BASED POSITIONING ACCURACY

(71) Applicant: Cypress Semiconductor Corporation, San Jose, CA (US)

(72) Inventors: Pouria Zand, Irvine, CA (US); Kiran Uln, Pleasanton, CA (US); Victor Simileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/514,162

(22) Filed: Oct. 29, 2021

(65) Prior Publication Data
US 2022/0050162 A1 Feb. 17, 2022

Related U.S. Application Data

(63) Continuation-in-part of application No. 16/597,743, filed on Oct. 9, 2019, now Pat. No. 11,378,642, which
(Continued)

(51) Int. Cl.
G01S 3/48 (2006.01)
G01S 3/12 (2006.01)
H04W 4/02 (2018.01)

(52) U.S. Cl.
CPC .................... G01S 3/48 (2013.01); G01S 3/12 (2013.01); H04W 4/023 (2013.01); H04W 4/026 (2013.01)

(58) Field of Classification Search
CPC .................... G01S 3/48; G01S 3/12
See application file for complete search history.

(56) References Cited

U.S. PATENT DOCUMENTS 3,090,957 A * 5/1963 Beisel, Jr. ............... G01S 1/02
342/461
5,973,643 A * 10/1999 Hawkes ............... H04W 64/00
455/456.5
(Continued)

FOREIGN PATENT DOCUMENTS

CN 111010221 A 4/2020
EP 2856200 A1 4/2015
(Continued)

OTHER PUBLICATIONS

1 Chinese Office Action for Application No. 201880019010.6 dated Nov. 14, 2022; 8 pages.

Primary Examiner — Marcus E Windrich

(57) ABSTRACT

Techniques by a wireless to estimate the position of a remote device are disclosed. A main receiver of the wireless device may determine multiple first phase values of the RF signal received through a first antenna during multiple time intervals. An auxiliary receiver may determine multiple second phase values of the RF signal received through an array of auxiliary antennas during the multiple time intervals. Each of the second phase value may correspond to the RF signal received through one antenna of the array during one of the time interval. The wireless device may determine an oscillator offset between a local oscillator of the main transceiver and a local oscillator of the auxiliary receiver. The wireless device may estimate an angle of arrival (AoA) of the RF signal or a distance based on the multiple first phase values and the multiple second values by compensating for the oscillator phase offset.

20 Claims, 16 Drawing Sheets

Related U.S. Application Data is a continuation of application No. 15/632,028, filed on Jun. 23, 2017, now Pat. No. 10,481,236.

(60) Provisional application No. 62/471,821, filed on Mar. 15, 2017.

(56) References Cited

U.S. PATENT DOCUMENTS

| | | | | |
|---|---|---|---|---|
| 6,177,907 B1* | 1/2001 | Golovin | | G01S 3/28 342/458 |
| 6,489,923 B1* | 12/2002 | Bevan | | G01S 3/023 342/378 |
| 7,092,673 B2* | 8/2006 | Bevan | | H04W 64/00 342/359 |
| 7,162,252 B2 | 1/2007 | Kennedy et al. | | |
| 7,847,733 B2* | 12/2010 | Shirakawa | | G01S 3/74 342/417 |
| 8,014,791 B2* | 9/2011 | Guigne | | G01S 5/021 340/5.1 |
| 8,207,892 B2* | 6/2012 | Abbasfar | | H04B 7/086 342/414 |
| 8,704,728 B2 | 4/2014 | Mujahed et al. | | |
| 9,121,923 B2 | 9/2015 | Bull et al. | | |
| 9,274,231 B2 | 3/2016 | Hatami et al. | | |
| 9,360,546 B2* | 6/2016 | Kim | | G06F 16/433 |
| 9,595,996 B2 | 3/2017 | Yun et al. | | |
| 9,860,096 B1* | 1/2018 | Ganwani | | H04W 4/33 |
| 10,481,236 B2* | 11/2019 | Simileysky | | G01S 3/48 |
| 2010/0302102 A1* | 12/2010 | Desai | | G01S 3/14 342/417 |
| 2011/0074633 A1* | 3/2011 | Pun | | G01S 3/043 342/442 |
| 2012/0015285 A1 | 1/2012 | Suh | | |
| 2012/0105285 A1* | 5/2012 | Park | | G01S 3/48 342/417 |
| 2012/0293235 A1* | 11/2012 | Nakamura | | H04H 40/90 327/360 |
| 2014/0070996 A1* | 3/2014 | Kneckt | | H04W 64/006 342/417 |
| 2014/0269389 A1* | 9/2014 | Bukkfejes | | H04W 24/08 370/252 |
| 2014/0327579 A1* | 11/2014 | Hart | | G01S 3/48 342/442 |
| 2015/0234033 A1* | 8/2015 | Jamieson | | G01S 3/12 455/456.1 |
| 2016/0327631 A1 | 11/2016 | Salokannel et al. | | |
| 2017/0026798 A1 | 1/2017 | Prevatt | | |

FOREIGN PATENT DOCUMENTS

| | | |
|---|---|---|
| EP | 2992353 A2 | 3/2016 |
| WO | 2018169697 A1 | 9/2018 |

* cited by examiner

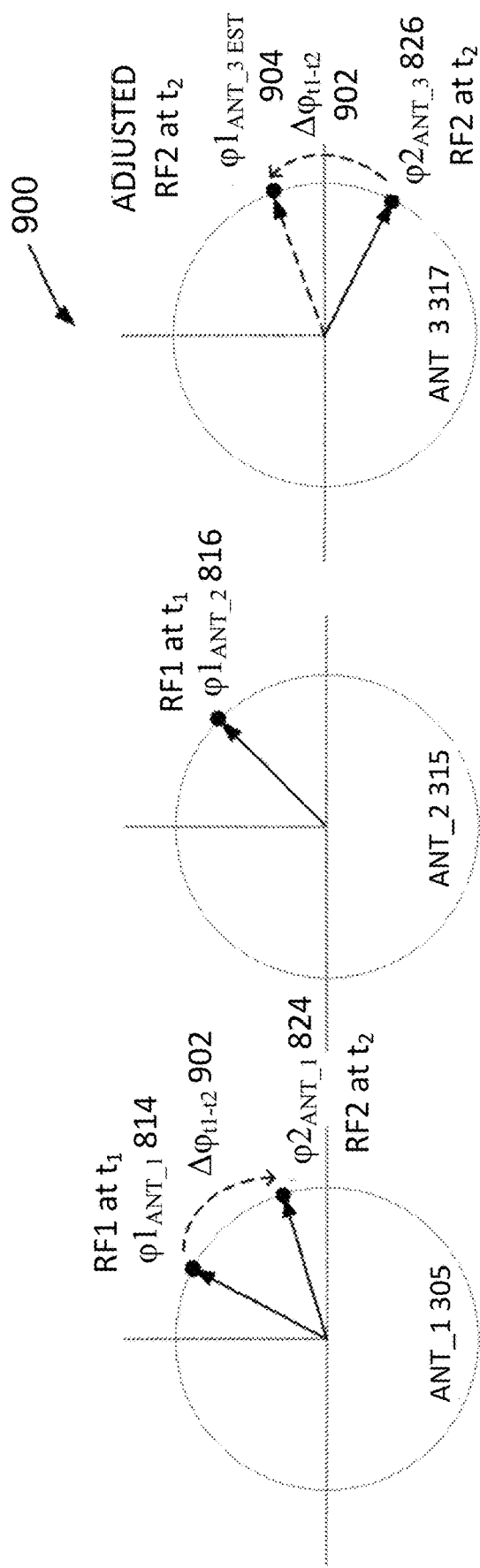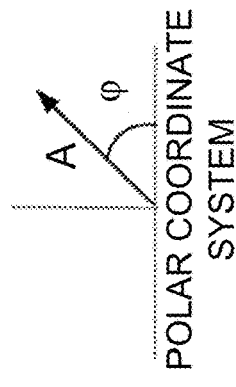
FIG. 9

SYSTEM AND METHODS FOR IMPROVING SECURE PHASE-BASED POSITIONING ACCURACY

RELATED APPLICATIONS

This application is a continuation-in-part of U.S. Non-Provisional application Ser. No. 16/597,743, filed Oct. 9, 2019, which is a continuation of U.S. Non-Provisional application Ser. No. 15/632,028, filed Jun. 23, 2017, now U.S. Pat. No. 10,481,236, which claims the priority benefit of U.S. Provisional Application No. 62/471,821, filed Mar. 15, 2017, all of which are incorporated herein by reference in its entirety.

TECHNICAL FIELD

The subject matter relates to the field of wireless connectivity solutions. More specifically, but not by way of limitation, the subject matter discloses techniques for estimating the position of a source of radio frequency signals by estimating the Angle of Arrival (AoA) of the signals and the distance to the signal source using secure phase-based techniques.

BACKGROUND

AoA typically refers to an angle between a source antenna and a group or array of multiple receiving antennas. Receiving devices can estimate the position of the source antenna by estimating the AoA and the distance from the source antenna based on a radio frequency (RF) signal emitted by the source antenna. Existing designs and techniques for estimating AoA and distance face various challenges such as backward compatibility issues and demands to reduce cost, footprint, and power consumption.

BRIEF DESCRIPTION OF THE DRAWINGS

Some embodiments are illustrated by way of example and not limitation in the figures of the accompanying drawings in which:

FIG. 9 is a graph diagram illustrating a phase differences used to provide an adjusted or estimated phase value, in accordance with an embodiment;

DETAILED DESCRIPTION

Described are systems and methods for improving the position estimate of a target device in secure phase-based ranging applications by estimating the AoA of RF signals emitted by the target device based on spatial diversity of antennas and improving the range estimates of the target device based on polarization diversity of antennas. In the following description, for purposes of explanation, numerous examples and embodiments are set forth in order to provide a thorough understanding of the claimed subject matter. It will be evident to one skilled in the art that the claimed subject matter may be practiced in other embodiments. The detailed description discloses examples of estimating AoA (also referred to as direction) and range (also referred to as distance) based on any incoming pattern of an RF signal with comparable accuracy and reduced power consumption compared to existing arrangements.

Figure 1:
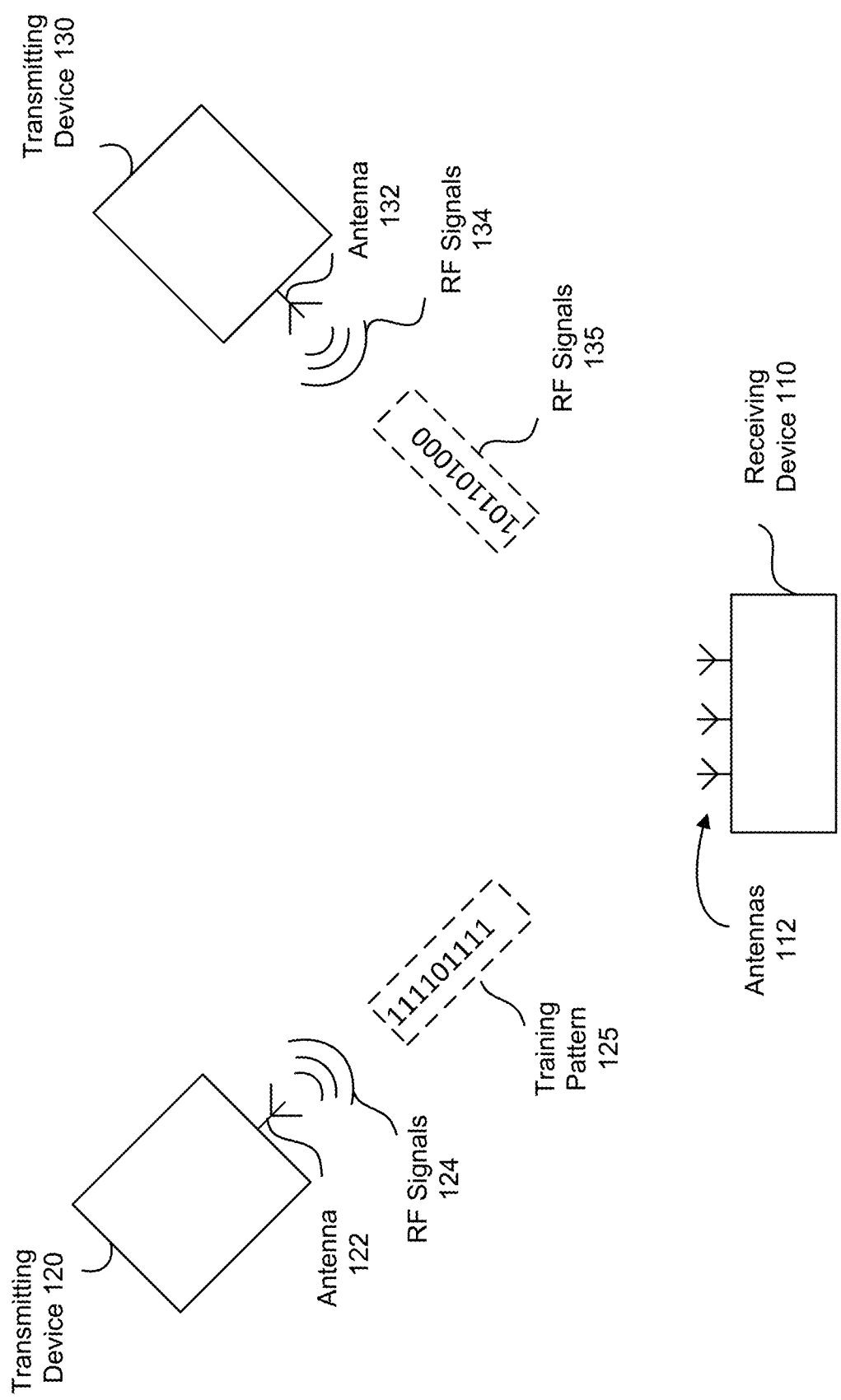
FIG. 1 is a block diagram illustrating a system including a receiving device to estimate relative directions of transmitting devices, in accordance with various embodiments.

Some embodiments are now briefly introduced and then discussed in more detail along with other embodiments beginning with FIG. 1. AoA of an RF signal can be estimated based on attributes or characteristics of the RF signal observed at two different antennas. For example, a wireless device can estimate AoA based on a phase difference of an RF signal concurrently received at two antennas spaced by a known amount. This direction-finding capability can be used in, for example but not limited to, asset/object tracking, gaming, networking, navigation applications, and/or Internet of Things (IoT) applications, including industrial, consumer, and automobile applications.

Some wireless devices with direction finding capability dedicate a different radio transceiver to each of its multiple antennas (e.g., referred to as multi-radio devices). In these multi-radio devices, each antenna is associated with a level of complexity. Not only do the number of transceivers impact the Bill-Of-Materials (BOM) and footprint of the wireless device, but there is a linear relationship between the number of antennas and complexity, which impacts power consumption, among other performance targets. On the other hand, some wireless devices use switching circuitry to couple its single transceiver (e.g., single-radio) to multiple antennas, one at a time, which can result in reduced BOM, footprint, complexity, and overall power consumption (e.g., compared to multi-radio solutions). These systems may have the complexity associated with one antenna, plus a small overhead for the switching control. In single-radio solutions, the RF signals are received through antennas at different times so determining the relevant phase differences (e.g. for AoA estimation) may rely on AoA training patterns (e.g., constant and/or predetermined RF signal modulation) and time-based predictions of phase values to provide reasonably accurate AoA estimations.

Embodiments described herein can accurately estimate AoA or distance from a target device without the BOM, footprint, complexity and power consumption issues presented by multi-radio (e.g., dedicated transceiver per antenna) solutions and without a need for constant and/or predetermined incoming patterns or phase prediction used in single radio solutions. Embodiments may have a complexity that is not more than a factor of two greater than single radio solutions. Embodiments that do use any transceivers can have complexity that is less than existing single radio solutions.

In an embodiment, a wireless device and a source of an RF signal are connected within a Wireless Personal Area Network (PAN). For example, the wireless device may be configured to receive Bluetooth and/or ZigBee RF signals having frequencies in the Industrial, Scientific, and Medical (ISM) band. The example wireless device includes a first receive path coupled to a first antenna of an antenna array and a second receive path coupled to a coupling circuit (e.g., a switch). The coupling circuit can alternately couple to a second antenna and a third antenna (or additional antennas) of the antenna array. In an embodiment, the first receive path includes a phase estimator to provide phase estimations associated with RF signals received through the first antenna and a demodulator to demodulate those RF signals (e.g. for subsequent packet processing). The second receive path includes a phase estimator to provide phase estimations associated with RF signals alternately received through the second antenna and the third antenna (or additional antennas). The example wireless device also includes processing circuitry that causes the coupling circuit to couple to the second antenna during a first period and to couple to the third antenna during a second period. The processing circuitry can estimate a direction of a source of the first and second RF signals relative to the antenna array (e.g., AoA of RF signals), based on a first phase difference of the first RF signal between the first antenna and the second antenna and a second phase difference of the second RF signal between the first antenna and the third antenna.

The example wireless device does not rely on constant and/or predetermined incoming patterns and phase predictions (e.g., of single radio solutions) because the first and second receive path can estimate the phases of an RF signal received and observed at two different antennas during the same period. In an embodiment, the wireless device achieves this without the full BOM, footprint, complexity, and power consumption (e.g., of the multi-radio solutions) by sharing among the second and third antenna (e.g., or additional antennas), a partial receive path, which need not include the additional processing required to demodulate RF signals.

In one embodiment, the wireless device may estimate the distance to a target device by exchanging modulated packets or constant tone signals with the target device and measuring the round-trip phase in the transmission and reception of the packets or signals in a secure phase-based ranging cycle. To improve the accuracy of the distance measurement, the wireless device may have antennas of different polarizations. The first receive path may be coupled to one of the antennas of different polarizations to receive the RF signal from the target device. The antennas of different polarizations provide polarization diversity information but may not provide angular information. To provide the angular information, the second receive path may be coupled to the second, third, or additional antennas of a second antenna array of the same polarization through the coupling circuit. The first receive path and a corresponding transmit path may be part of a main transceiver of the wireless device. The second receive path may be part of a partial receiver of the wireless device. The partial receiver does not have transmit capability.

The secure phase-based ranging cycle may include multiple time-slots where at least two of the time-slots may be used to exchange constant tone signals at two different channels to estimate the distance. Each time-slot may include a receiving time interval during which the wireless device receives a constant tone signal from the target device to measure its phase and a transmission time interval during which the wireless devices transmits a constant tone signal for phase measurements by the target device. In each time-slot, the wireless device and the target device may exchange the constant tone signals in a different channel from the previous or the next time-slot. In one embodiment, at the end of the secure phase-based ranging cycle, the two devices may exchange 80 constant-tone signals across the entire 2.4 GHz ISM band. In one embodiment, during the receiving time interval of a secure phase-based ranging cycle, the first receive path may cycle through the antennas of different polarizations to estimate the phase associated with the RF signals alternatively received through the polarized antennas. Within each such receiving time interval when the first receive path is coupled to one of the polarized antennas, the second receive path may be cycled through the second, third, and additional antennas of the second array to estimate the phase associated with the RF signals alternatively received through the antennas of the second array. The phase estimate measured from each of the polarized antennas in the first receive path may be used as a reference phase to determine the phase differences to the phase estimates measured from the antennas of the second array in the corresponding receiving period to estimate a direction of the RF signals.

As described, the phase difference used to estimate AoA is based on phase values acquired by different receive paths.

Thus, a difference in phase offsets experienced by the two receive paths can influence the accuracy of AoA estimations. Some embodiments include a regulator to identify, regulate, and/or initiate compensation for such differences in phase offset. For example, the regulator may regulate one or more local oscillator inputs to down-conversion mixers (e.g. in each of the first receive path and the second receive path) to reduce and/or compensate for an effect of phase offset on the AoA estimation.

In one embodiment, only one antenna (e.g., first antenna) may be coupled to the first receive path, but the array of antennas (e.g., second, third, and other antennas) coupled to the second receive path through the coupling circuit may have different polarizations to provide polarization diversity to improve the distance estimate to the target device. The array of polarized antennas may also be used to serially transmit constant tone signals in conjunction with the first antenna during a transmission time interval of a phase ranging cycle. The first receive path and the corresponding transmit path may be part of a main transceiver of the wireless device. A partial transceiver of the wireless device may contain the second receive path and the corresponding transmit path coupled to the array of antennas through the coupling circuit. The regulator may synchronize the phases of the constant tone signals generated by the main transceiver and the partial transceiver during the transmission time interval of a phase ranging cycle, in addition to synchronizing or compensating for the phase offset in the local oscillators of the main transceiver and the partial transceiver during the receiving time interval.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a system 100 including a receiving device 110 to estimate relative directions of transmitting devices 120 and/or 130, in accordance with various embodiments. The transmitting device 120 is shown to transmit through antenna 122 RF signals 124 encoding a training pattern 125 and the transmitting device 130 is shown to transmit through antenna 132 RF signals 134 encoding any pattern 135. The receiving device 110 is coupled to multiple antennas 112 (e.g., three or more) to receive the RF signals 124 and 134. To estimate the relative directions of transmitting devices 120 and/or 130, the receiving device 110 determines the AoA of the RF signals 124 and the RF signals 134, in accordance with embodiments described herein. As will be discussed with respect to FIG. 17, embodiments described herein may be used to enhance numerous direction finding uses cases and applications.

In some embodiments, one or more of the transmitting devices 120 and 130 include circuitry to not only transmit RF signals but also to receive RF signals. Although not shown, either of the transmitting devices 120 and 130 may include multiple antennas for transmit and/or receive operations. Conversely, the receiving device 110 may include circuitry to not only receive RF signals but also to transmit RF signals. In embodiments, any of the devices 110, 120, and 130 may be coupled to another computer device (not shown) through a wired or wireless connection.

Communication protocols supported by one or more of the devices 110, 120, and 130 may include, without limitation, Bluetooth, ZigBee, or Wi-Fi. The devices 110, 120, and 130 may be connected as part of a Wireless Personal Area Network (WPAN), a Wireless Local Area Network (WLAN), or any other wireless network to wirelessly connect computer devices.

In some embodiments, the RF signals 124 and 134 (e.g., the carrier waves) may be modulated to encode messages and/or to define patterns, either streamed or packetized, of a communication protocol. In some embodiments, the receiving device 110 can estimate the AoA of RF signal 134 based on any pattern 135 where the modulation of the RF signal 134 does not present a constant or predetermined incoming pattern. For example, unlike single-radio systems that rely on incoming patterns corresponding to a known sequence of zeros and ones, such as the training pattern 125, embodiments described herein can estimate AoA using any incoming pattern of any RF signal, whether or not the incoming pattern is known (e.g., by the receiving device 110). Without this ability of the embodiments, devices that do not transmit the training pattern 125 will be difficult if not impractical to track using devices with low complexity comparable to single-radio solutions. An example wave propagation model for estimating AoA is discussed with respect to FIG. 2.

Figure 2:
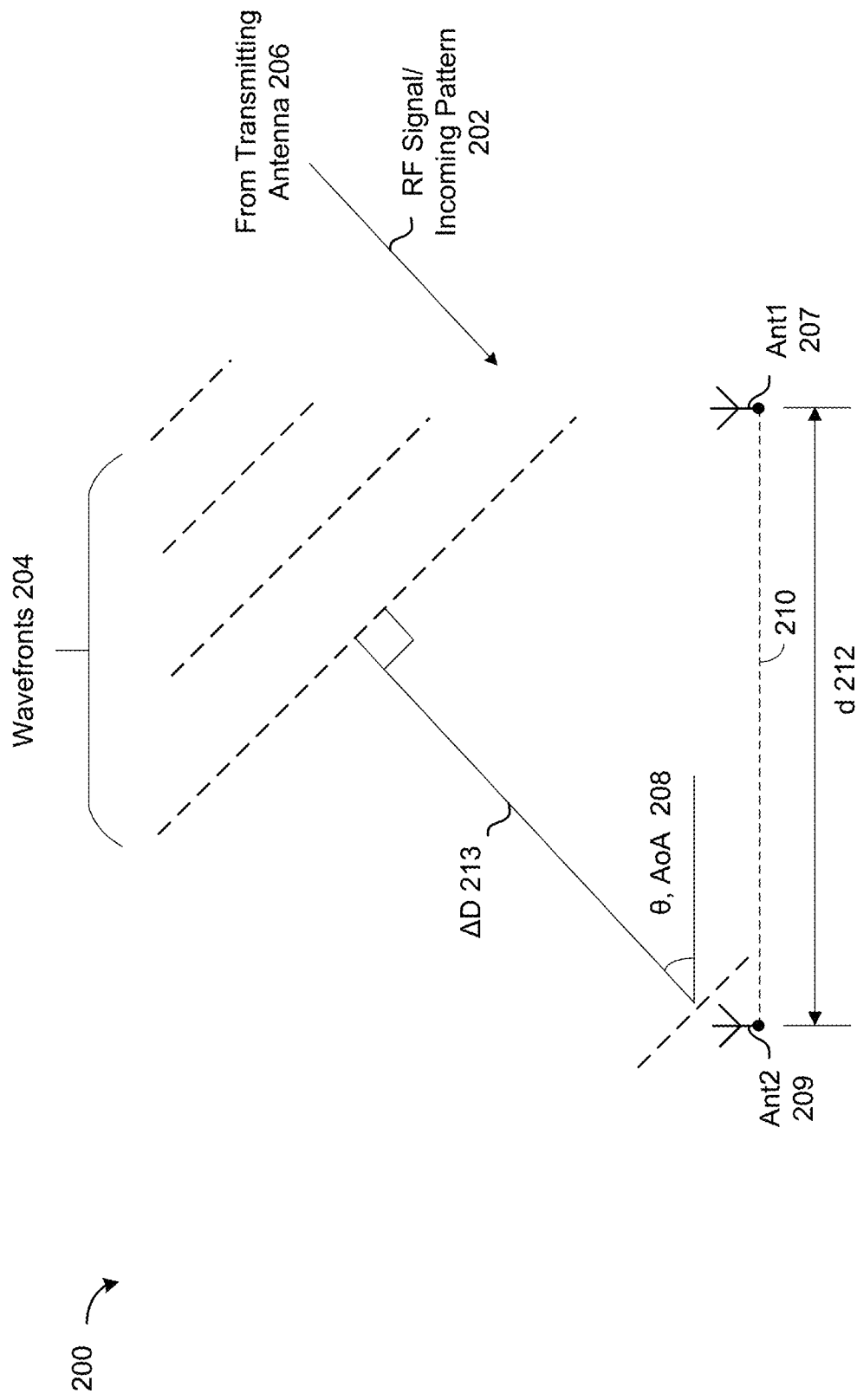
FIG. 2 illustrates a wave propagation model for determining AoA, in accordance with various embodiments.

FIG. 2 illustrates a wave propagation model 200 for determining AoA, in accordance with various embodiments. The RF signal/incoming pattern 202 in FIG. 2 is represented by isoplane wavefronts from a far-field transmitting antenna 206. FIG. 2 shows that the transmitting antenna 206 is at an angle θ, AoA 208 from the axis 210 of the antenna 1 207 and antenna 2 209, which are a distance, d 212 apart. The extra distance that the RF signal travels from antenna 1 207 to reach antenna 2 209 can be expressed as the path difference ΔD 213. By trigonometric identity, θ, AoA 208 is expressed as in the following equation (1):

$$\theta = \cos^{-1}\left(\frac{\Delta D}{d}\right)$$

In some embodiments, ΔD 213 may be estimated by calculating the distance that the RF signal 202 (e.g., a wavefront) traveled (e.g., at the speed of light) between the time it arrived at antenna 1 207 and the time it arrived at antenna 2 209. These times of RF signal 202 arrival and speed of the RF signal 202 are examples of attributes of the RF signal 202 that may be used to estimate the AoA 208. The path difference ΔD 213 may also be expressed through other attributes of the RF signal 202, for example, as the following equation (2):

$$\Delta D = \frac{\lambda}{2\pi}(\varphi_{A2} - \varphi_{A1})$$

where λ is the wavelength of the RF signal 202 and $\varphi_{A1}$ and $\varphi_{A2}$ are phase values of the RF signal 202 antenna 1 207 and antenna 2 209, respectively.

λ can be expressed as in the following equation (3):

$$\lambda = \frac{c}{f}$$

where f is the frequency of the RF signal 202 and c is the speed of light.

Substituting equation (3) into equation (2) above, with all other variables known, AoA 208 can be estimated by determining the phase difference, $\varphi_{A2}-\varphi_{A1}$ as illustrated in the following equation (4):

$$\theta = \cos^{-1}\left(\frac{c(\varphi A2 - \varphi A1)}{2\pi fd}\right)$$

In some embodiments described herein, estimating the AoA 208 of the RF signal 202 is based on estimating the phases of the RF signal 202 (e.g., an attribute of the RF signal) at multiple antenna elements. Due to the difference in propagation distances from the transmitting antenna 206, the antenna 1 207 and the antenna 2 209 observe a different phase of the RF signal 202. For example, if the wavefronts 204 are assumed to propagate in parallel through space, the phase observed by antenna 1 207 will be $\varphi_{A1}$ (not shown) and the phase observed by antenna 2 209 will be $\varphi_{A2}$ (not shown). In some embodiments, the difference between $\varphi_{A1}$ and $\varphi_{A2}$ is the phase difference used to estimate AoA based, at least in part, on equation 4, and/or other relationships involving RF signal attributes that can be used to estimate the AoA 208.

Figure 3:
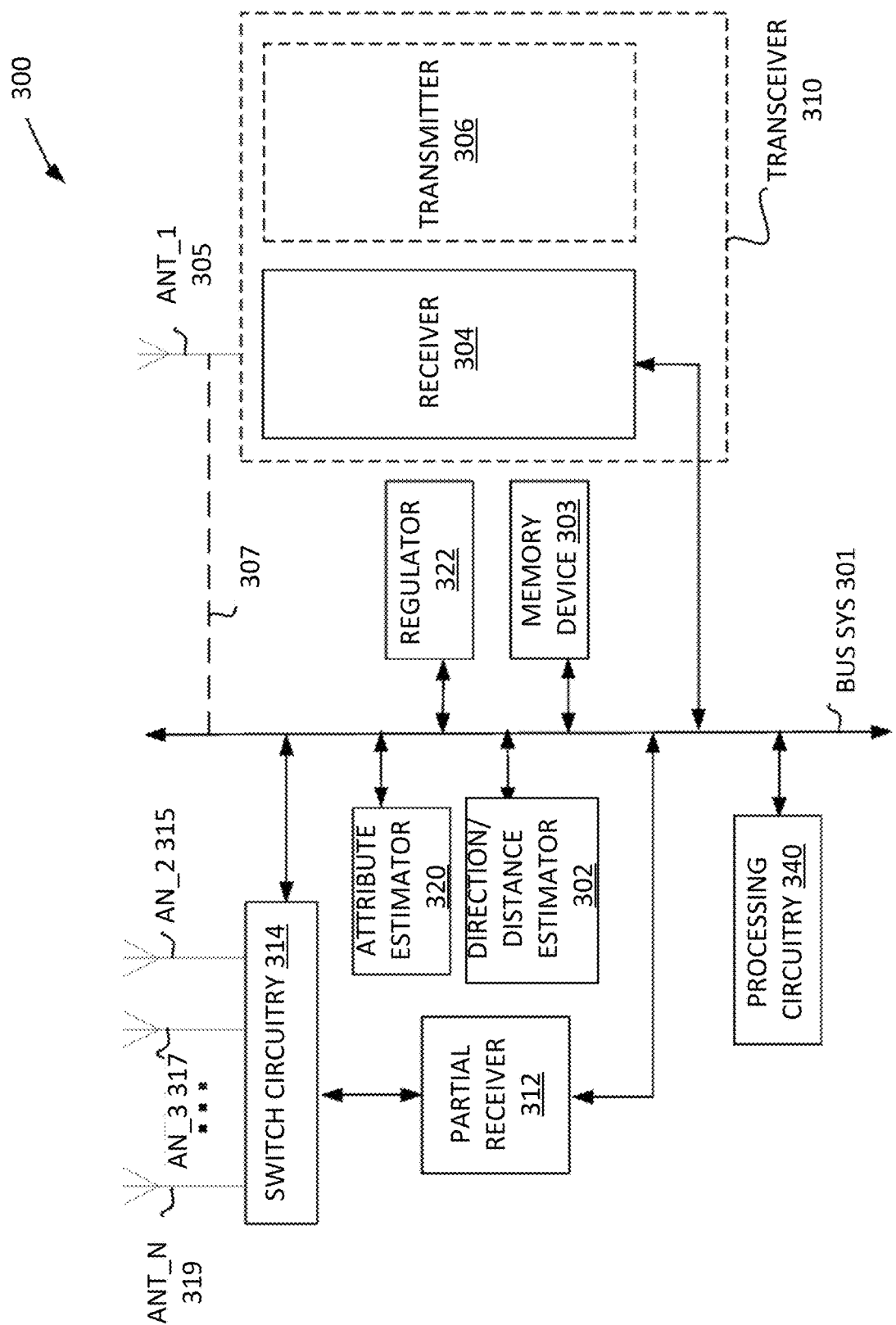
FIG. 3 is a block diagram illustrating a wireless device to estimate AoA based on an RF signal, in accordance with embodiments.

Example structures and methods for estimating AoA without the BOM, footprint, complexity and power consumption issues of some multi-radio (e.g., dedicated transceiver per antenna) solutions, and without the constant and/or predetermined incoming patterns and phase prediction requirements of single radio solutions, are discussed with respect to FIG. 3.

FIG. 3 is a block diagram illustrating a wireless device 300 to estimate AoA based on an RF signal, in accordance with some embodiments. In an embodiment, the wireless device 300 may be the receiving device 110 of FIG. 1. The various function blocks in FIG. 3 are shown to be coupled to one another through a bus system 301. The bus system 301 including the connections (e.g., the arrows) between the various blocks may represent one or more media for propagation of analog signals, digital data, control signals, power supply, and/or or any other communication. The bus system 301 may include any appropriate bus configuration without departing from the claimed subject matter.

The direction and distance estimator 302 is to estimate the direction and distance of a source (e.g., a transmitting antenna) of an RF signal relative to multiple receive antennas (e.g., three or more) using one or more attributes of the RF signal. The direction and distance estimator 302 may estimate direction based, at least in part, on equation 4, discussed above with respect to FIG. 2. Accuracy of the AoA estimate can depend on various factors including, without limitation, the number of antennas (e.g., diversity in space), the duration that RF signals are received on each antenna (e.g., number of samples), and signal quality. In embodiments, the samples of the RF signal all correspond to one or more communication protocol packets (e.g., successive packets) and the direction and distance estimator 302 can estimate AoA without establishing a modulation (e.g., Gaussian Frequency-Shift Keying (GFSK)) connection with the source device. In embodiments, the direction and distance estimator 302 may provide or initiate raw data processing to perform noise filtration, data averaging over time, and/or antenna model correlation for the estimation of the final result. Since the direction and distance estimator 302 can estimate AoA based on any incoming pattern, it can locate devices that are not AoA aware (e.g., legacy devices that do not send a predetermined training signal for AoA estimation) as well as AoA aware devices.

In some embodiments, the wireless device 300 may exchange modulated packets or constant tone signals over different frequency channels with a target device. The direction and distance estimator 302 may measure the round-trip phase in the transmission and reception of the packets or signals over the multiple channels to estimate the distance to the target device. The wireless device 300 may use a number of antennas of different polarizations (e.g., diversity in polarization) to transmit or receive the constant tone signals to improve the accuracy of the distance estimate in a multi-path environment. Antenna polarization may also make it more difficult for an intruder to manipulate the phase of all the antenna paths in secure phase-based ranging applications. In one embodiment, the wireless device 300 may use the improved AoA estimates due to the spatial diversity of the antennas and/or the improved distance estimates due to the polarization diversity of the antennas to improve the position estimate of the target device. The wireless device 300 may determine the position of the target device from the AoA and distance estimates using techniques such as triangulation, trilateration, or a combination thereof.

The receiver 304 is to receive RF signals through one or more antennas. Although the receiver 304 is shown in FIG. 3 to be coupled to antenna 1 305, in other embodiments, the receiver 304 may be coupled through switching circuitry (e.g., switching circuitry 314), to any antenna of the wireless device. In some embodiments, the receiver 304 may be coupled to an array of antennas of different polarizations. The array of polarized antennas may be used to receive or transmit RF signals of different polarizations to improve the accuracy of distance measurements during a ranging cycle. In an embodiment, the receiver 304 along with the transmitter 306 is part of the transceiver 310.

The partial receiver 312 is shown to be coupled to the switch circuitry 314 and is to receive RF signals through one antenna at a time depending on the switch configuration. The switch circuitry 314 may couple one antenna of an array of antennas such as antenna 2 315, antenna 317, . . . antenna N 319 to the partial receiver 312. In some embodiments, antenna 2 315, antenna 317, . . . antenna N 319 may have different polarizations to provide polarization diversity. Although the partial receiver 312 is shown to be coupled to the switch circuitry, the receiver 304 may alternatively or additionally be coupled to the switch circuitry 314. For example, diversity in space can be achieved by coupling the receiver 304 to multiple antennas (e.g., one at a time) through a switch and coupling the partial receiver 312 to a single (e.g., or multiple) antennae. For some embodiments, the partial receiver 312 is part of a transceiver (not shown). For example, a partial transceiver may be used to transmit constant tone signals in synchronization with the transmitter 306 of the transceiver 310 during a transmission time interval of a phase ranging cycle. In an embodiment, the switch circuitry 314 is a multi-pole switch controlled by the processing circuitry 340 by an input signal. The switch circuitry 314 may be any appropriate coupling circuitry known in the art whose switching and/or selection function may be controlled by any block (e.g., within or external to the wireless device 300) coupled to its input.

In some embodiments, the receiver 304 provides additional functionality compared to the partial receiver 312 and consequently may have additional processing requirements and hardware. As will be discussed in more detail with respect to FIGS. 4 and 5, in some embodiments, in addition to estimating phase of RF signals for AoA estimations, the receiver 304 may provide analog and digital signal processing to provide demodulation of RF signals for the wireless device 300. The partial receiver 312 may provide the relatively less analog and digital signal processing used to estimate phase of the RF signals for AoA or distance estimations. The partial receiver 312 may also be referred to as a partial functionality receiver, an auxiliary receiver or a partial receiver processing. In some embodiments, the partial receiver 312 may be part of a partial transceiver that includes a transmitter of reduced capability to transmit constant tone signals but not modulated signals in synchronization with the transmitter 306 of the transceiver 310.

Although some embodiments may include more receive processing (e.g., the receiver 304 and the partial receiver 312) than single radio solutions, embodiments can estimate AoA or distance of a source of any RF signal (e.g., any incoming pattern) received at multiple antennas using as little as two partial receivers. Neither the receiver 304 nor the partial receiver 312 need be part of a full transceiver to estimate AoA or distance, but even in embodiments where one or both receivers are a part of full transceivers, those embodiments would still represent lower BOM, footprint, power consumption, yet with enhanced ability to estimate AoA or distance based on any incoming pattern (e.g., protocol independence) compared to conventional multi-radio and single radio solutions.

The attribute estimator 320 is to estimate attributes of RF signals. Attributes of RF signals may include, without limitation, signal frequency, angular frequency, amplitude, phase, wavelength, wave speed, time of arrival, time difference of arrival, time of transmission, time difference of arrival and transmission, phase difference, phase difference of arrival, signal strength, and/or any other RF signal attributes or derivatives thereof. The attribute estimator 320 is to provide estimated attributes to the direction and distance estimator 302 for use in estimating AoA or distance. In some embodiments, the attribute estimator 320 receives attribute information representing or related to RF signal attributes from the receiver 304 and/or the partial receiver 312 and the attribute estimator 320 may estimate RF signal attributes using the attribute information. The attribute estimator 320 may include analog and/or digital logic and/or measurement configurations to obtain RF attributes based on measurements or samples made at one or more locations along the receive path of an RF signal. Although shown as being separate, the attribute estimator 320 may be implemented in whole or in part within the direction and distance estimator 302, the receiver 304, or the partial receiver 312. In an embodiment, the receiver 304 and the partial receiver 312 each include their own attribute estimator (e.g., see phase estimators in FIGS. 4 and 5).

In embodiments, when the partial receiver 312 is used to acquire a second reference in space (e.g., the receiver 304 acquires the first reference in space) for AoA estimation, the regulator 322 is used to establish that that the two references in space are not unacceptably separated in time (e.g., outside of compensation capabilities).

The regulator 322 is to regulate and/or compensate for conditions of the receiver 304 and the partial receiver 312 so that attributes of the received RF signals can be relied upon for use in AoA estimations. For example, the regulator 322 may determine and/or regulate frequency, phase, or other characteristics of input to or output from the receiver and the partial receiver 312 to control the effect on RF signal attributes used for AoA estimation. In one embodiment, the regulator 322 includes a local oscillator whose signal is coupled to both the receiver 304 and the partial receiver 312 as input to their respective mixers to down-convert incoming RF signals to intermediate frequency signals. By applying the same local oscillator signal to the receiver 304 and the partial receiver 312, the regulator 322 can establish acceptably similar phase offset (e.g., to the RF signal) in the receiver 304 and the partial receiver 312. In an embodiment, the phase offsets are acceptably similar and within a predetermined range of synchronization when the effect of the pattern change (e.g., due to the offset) is within an acceptable estimation error (e.g., assuming that capture time is within a fraction of the symbol duration). As a result, when the attribute estimator 320 provides phase values as RF signal attributes, the phase value of the RF signal received through antenna 1 305 and the phase value of the RF signal received through antenna 2 315 will have the acceptably similar phase offset introduced by the regulator 322.

Alternatively or additionally, the regulator 322 may determine an existing phase offset of the receiver 304 and an existing phase offset of the partial receiver 312 and if the phase offsets are not acceptably similar, perform or initiate a corrective action. For example, the regulator 322 may provide the difference in phase offsets to the direction and distance estimator 302 or the attribute estimator 320 so that the difference can be compensated for in the AoA or distance estimation.

A difference in phase offsets may occur in an embodiment where the receiver 304 and the partial receiver 312 receive their local oscillator signals from different local oscillators. The local oscillator signal for the receiver 304 can have a different frequency or phase from the local oscillator signal of the partial receiver 312—resulting in different phase offsets. The difference in local oscillator frequency may be due to inadvertent lack of synchronization, and/or other tuning differences.

In an embodiment, the regulator 322 or the attribute estimator 320 (e.g., a phase estimator) may monitor and/or sample the signal output from each local oscillator and compare the estimated phase of each signal to determine the difference in phase offset between the receiver 304 and the partial receiver 312. Alternatively or additionally, the regulator 322 may deduce the difference between the phase offsets caused by the two local oscillators. To this end, the regulator 322 may cause antenna 1 305 to be concurrently coupled to the receiver 304 and the partial receiver 312 (e.g., through the conductor 307 and the switch circuitry 314). The attribute estimator 320 may then estimate the phase of the RF signal received through antenna 1 305 and the receiver 304 and the phase of the same RF signal received through antenna 1 305 and the partial receiver 312. Since the RF signal was received during the same period (e.g., at the same time) and through the same antenna, the regulator 322 can deduce that any difference between the estimated phases is the difference between the phase offsets introduced by the local oscillator of the receiver 304 and local oscillator of the partial receiver 312. The regulator 322 may report the difference in phase offsets to the direction and distance estimator 302 so that the difference can be compensated for in the AoA or distance estimation.

In an embodiment, when the partial receiver 312 is part of a partial transceiver used to transmit constant tone signals in synchronization with the transmitter 306, the regulator 322 may synchronize the phase of the constant tone signals generated by the transmitter 306 and the partial transceiver during the transmission time interval of a phase ranging cycle.

In various embodiments, the processing circuitry 340 is to execute at least a portion of one or more of the direction and distance estimator 302, the attribute estimator 320, the regulator 322, or any other function block of the wireless device 300, using corresponding firmware stored in the memory device 303. Alternatively or additionally, any of the function blocks of the wireless device 300 shown in FIG. 3 may include its own processing circuitry (not shown) and/or memory. For example, the direction and distance estimator 302, the attribute estimator 320, the regulator 322, or any other function block of the wireless device 300 may include hardware (circuitry, dedicated logic, etc.), software (such as is run on a general purpose computing system or a dedicated machine), firmware (embedded software), or any combination thereof to perform its functionality.

In an embodiment, the processing circuitry 340, the memory device 303, the receiver 304, the partial receiver 312, and the switch circuitry 314 are part of a System on Chip (SoC) and may reside on a common carrier substrate or be implemented in different combinations of separate integrated circuits. The example SoC may be configured to implement the attribute estimator 320, the direction and distance estimator 302, and/or the regulator 322, in accordance with embodiments.

Figure 4:
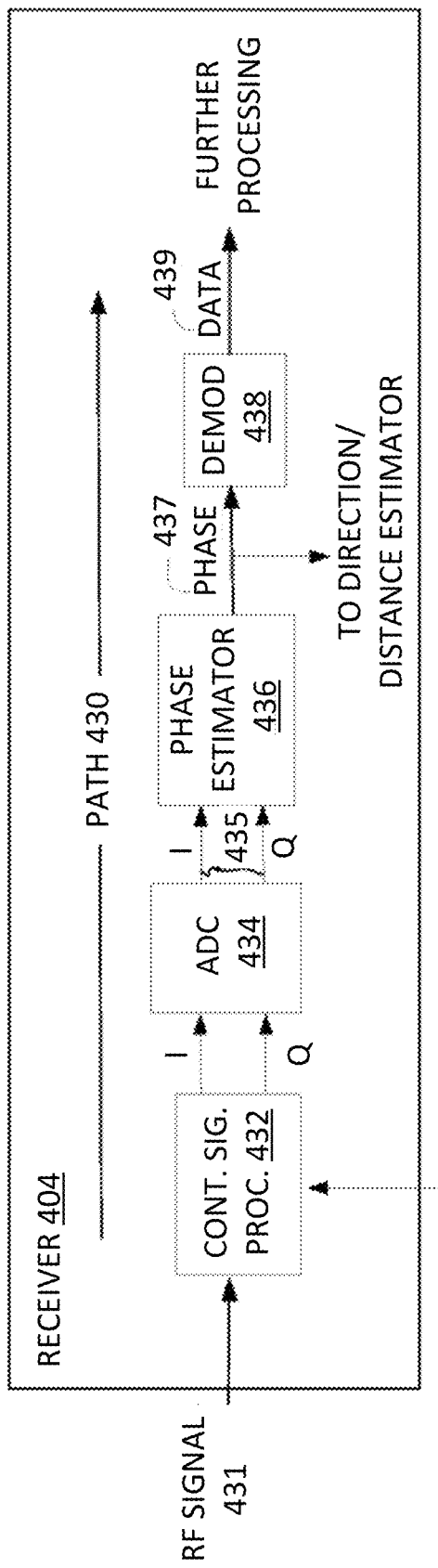
FIG. 4 is a block diagram illustrating a receiver, in accordance with an embodiment.
Figure 5:
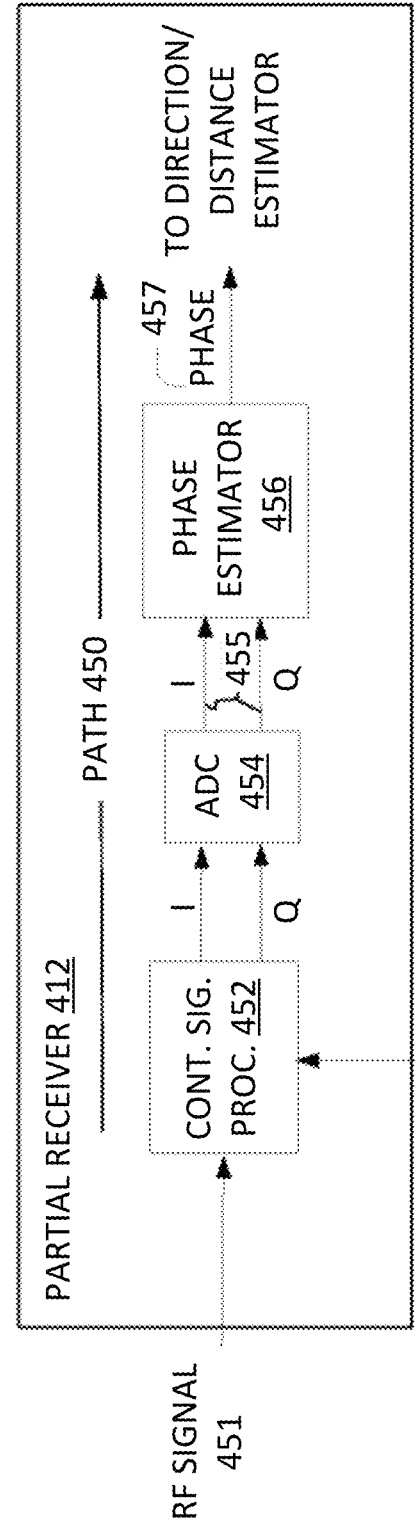
FIG. 5 is a block diagram illustrating a partial receiver, in accordance with an embodiment.

Embodiments of the receiver 304 and the partial receiver 312 are discussed with respect to FIGS. 4 and 5, respectively, and illustrate embodiments where the receiver 304 and the partial receiver 312 each include its own attribute estimator (e.g., a phase estimator) and where the partial receiver 312 has overall less circuitry and functionality than the receiver 304.

FIG. 4 is a block diagram illustrating a receiver 404, in accordance with an embodiment. The receiver 404 of FIG. 4 is an example of the analog and digital signal processing used to provide the demodulation function for a wireless device. The partial receiver 412 of FIG. 5 is an example of the relatively less analog and digital signal processing used to estimate phase of the RF signals 451 for AoA or distance estimations. By providing phase estimation but not demodulation, the partial receiver 412 represents a reduction in BOM, complexity, and power consumption compared to multi-radio AoA solutions.

The receiver 404 is shown to include continuous-time signal processing 432, analog to digital converter (ADC) 434, phase estimator 436, and demodulator 438 all along a receive path 430. In an embodiment, the RF signal 431 enters the continuous-time signal processing 432 where it is filtered and mixed with the local oscillator signal 433 to down-convert the desired frequency (e.g., or channel) to an intermediate frequency. In an embodiment, the down-conversion process provides the intermediate frequency as complex I and Q signals which are sampled and digitized by the ADC 434. The phase estimator 436 may perform calculations to estimate the phase 437 of the RF signal 431 for the time it was received at the antenna using the I and Q values 435, and forward the phase value to the demodulator 438, which forwards the data 439 (e.g., the decoded sequence of 1s and 0s) for further processing (e.g., packet processing). The phase estimator 436 also forwards the phase 437 to the direction and distance estimator 302 of FIG. 3 (e.g., or to a memory) for use in AoA or distance estimation as described herein.

FIG. 5 is a block diagram illustrating a partial receiver 412, in accordance with an embodiment. The partial receiver 412 is shown to include continuous-time signal processing 452, ADC 454, and a phase estimator 456 along the receive path 450. In an embodiment, when the RF signal 451 is received it enters continuous-time signal processing 452 where it is filtered and mixed with the local oscillator signal 453 to down-convert the desired frequency or channel to an intermediate frequency. In an embodiment, the down-conversion process provides the intermediate frequency as complex I and Q signals which are sampled and digitized by the ADC 454. The phase estimator 456 estimates the phase 457 of the RF signal 451 for the time it was received at the antenna using the I and Q values 455 and forwards the phase 457 to the direction and distance estimator 302 for use in AoA or distance estimation.

Figure 6:
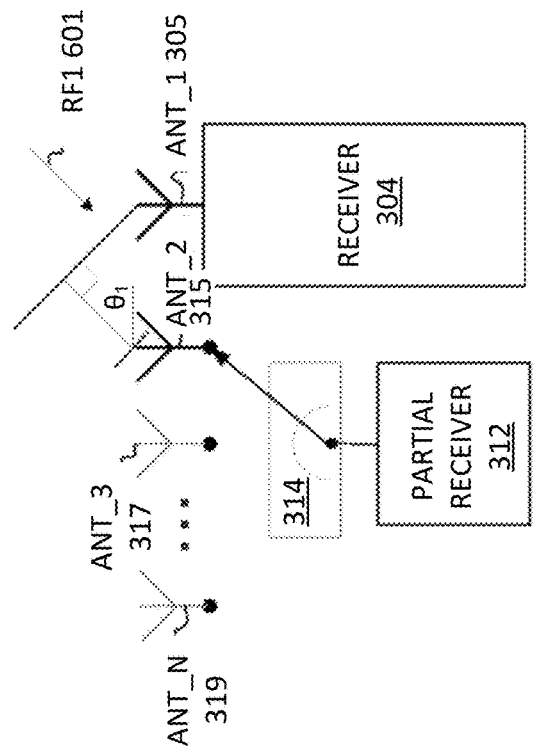
FIG. 6 is block diagram showing a receiver coupled to an antenna and a partial receiver coupled to another antenna through switch circuitry, in accordance with an embodiment.
Figure 7:
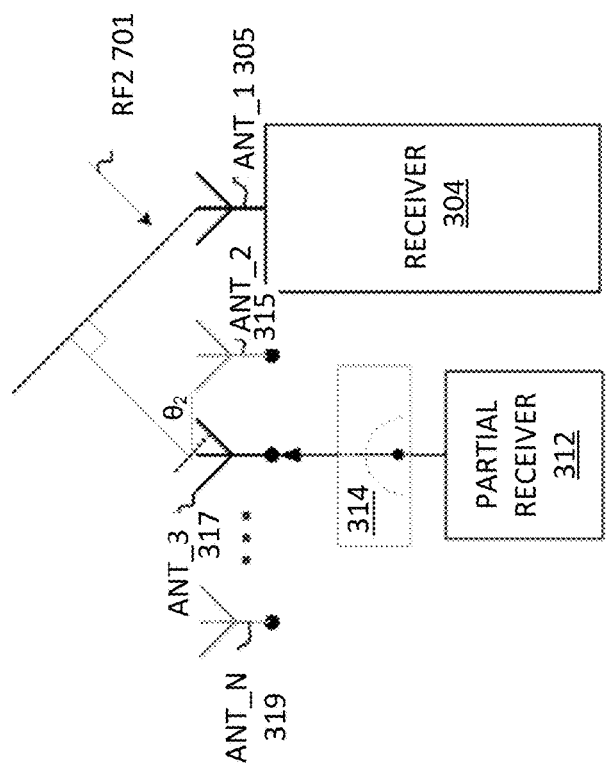
FIG. 7 is a block diagram showing the receiver coupled to the same antenna and the partial receiver coupled to yet another antenna through switch circuitry, in accordance with an embodiment.

FIGS. 6 and 7 illustrate switch configurations to couple the partial receiver 312 to different antennas during different periods. In the discussion of FIGS. 6 and 7, the receiver 304, antenna 1 305, partial receiver 312, switch circuitry 314, antenna 2 315, antenna 3 317, and antenna N 319, of FIGS. 6 and 7 may be the same or similar to those described with respect to FIG. 3.

FIG. 6 is a block diagram showing the receiver 304 coupled to antenna 1 305 and the partial receiver 312 coupled to antenna 2 315 through the switch circuitry 314, in accordance with an embodiment. The configuration of the switch circuitry 314 is controllable via control signal (not shown). RF signal RF1 601 is received at antenna 1 301 and antenna 2 315 during the same period. Prior to or during that period, the switch circuitry 314 couples the partial receiver 312 to the antenna 2 315 in time to provide RF1 601 to the partial receiver 312 for phase estimation before the switch circuitry 314 couples the partial receiver 312 to antenna 3 317 (e.g., or another of the antennas 2-N).

Figure 8:
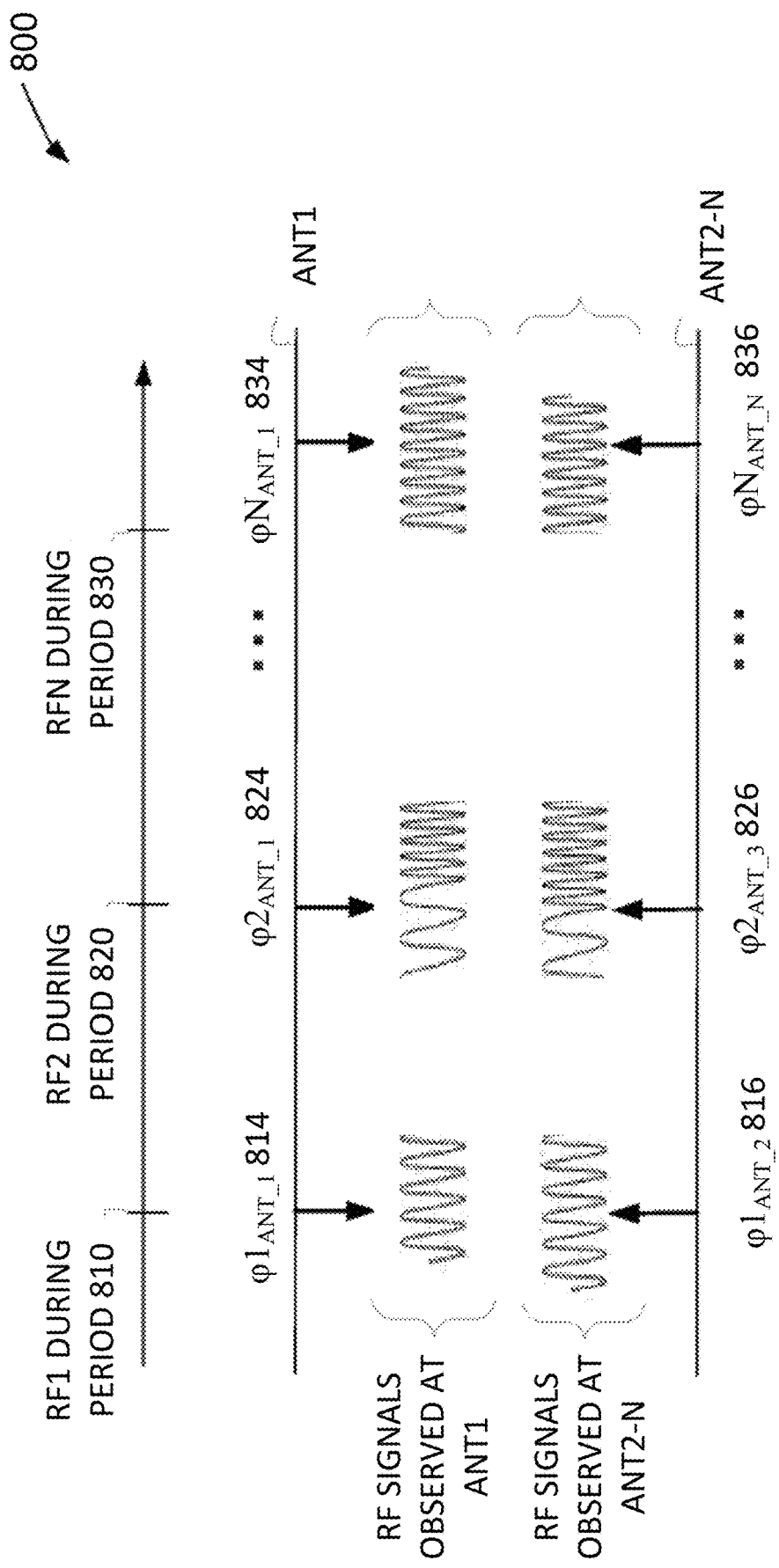
FIG. 8 is a chart diagram illustrating coordination of phase estimations during different periods, in accordance with an embodiment.

FIG. 8 is a chart diagram 800 illustrating coordination of phase estimations during the different periods, in accordance with an embodiment. Referring to FIG. 8, the configuration described with respect to FIG. 6 is discussed where the phase value of RF1 during the period 810, observed on antenna 1 305, is estimated as $\varphi1_{ANT1}$ 814; and the phase value of RF1 during the period 810, observed on antenna 2 315, is estimated as $\varphi1_{ANT2}$ 816. As can be seen in FIG. 8, different portions of RF1 are observed at antenna 1 305 and antenna 2 315 during period 810, resulting in different estimated phases. Although FIG. 8 depicts the frequency modulated RF signals reaching antenna 2 315 first, in some embodiments the RF signals may reach other antennas first and/or be modulated with respect to phase or otherwise, without departing from the claimed subject matter. In some embodiments, the RF signals may be unmodulated constant tone signals.

FIG. 7 is a block diagram showing the receiver 304 coupled to the antenna 1 305 and the partial receiver 312 coupled to the antenna 3 317 through the switch circuitry 314, in accordance with an embodiment. In some embodiments, switch circuitry 314 is controlled by the partial receiver 312. RF signal RF2 701 is received at antenna 1 305 and antenna 3 317 during the same period. Prior to or during that period, the switch circuitry 314 couples the partial receiver 312 to the antenna 3 317 in time to provide RF2 701 to the partial receiver 312 for phase estimation before the switch circuitry 314 couples the partial receiver 312 to another of the antennas 2-N to receive a subsequent RF signal.

Referring again to FIG. 8, the configuration described with respect to FIG. 7 is discussed where the phase value of RF2 during period 820, observed on antenna 1 305, is estimated as $\varphi2_{ANT1}$ 824; and the phase value of RF2 during period 820, observed on antenna 3 317, is estimated as $\varphi 2_{ANT3}$ 826. The switching circuitry 314 may proceed to couple the partial receiver 312 to antenna N 319 by way of any intervening antennas, where the phase value of RFN during period 830, observed on antenna 1 305, is estimated as $\varphi N_{ANT1}$ 834; and the phase value of RFN during period 830, observed on antenna N 319, is estimated as $\varphi N_{ANTN}$ 836. FIG. 8 illustrates that the embodiments described herein provide phase estimations (e.g., or other RF signal attributes) for RF signals received at antennas during a same period, where the antennas are diverse in space to allow for AoA or distance estimation based on any incoming pattern using less receiver circuitry than multi-radio solutions.

The switching between the antennas can be timed and/or ordered such that an adequate number of phase values are obtained within the duration of one or more successive packets or signal intervals, such that resulting AoA or distance estimations fall within a targeted range of accuracy. The switching between antennas 2-N may be timed and/or ordered so that phase values of RF signals corresponding to certain portions of packets (e.g., certain fields) or signal intervals can be estimated. In addition, switch timing may be optimized to meet performance targets (e.g., power consumption, accuracy, speed) based on the frequency, wavelength, receive strength, incoming pattern, or any other attributes of the RF signal.

Accuracy of AoA or distance estimation can typically improve by combining a number of independent attribute estimations for a particular RF signal or packet. In some embodiments, multiple antennas (e.g., 8-10) are used in various configurations to obtain multiple phase values, which can be input to estimating algorithms such as MUltiple SIgnal Classification (MUSIC), Estimation of Signal Parameters via Rotational Invariance (ESPRIT), Generalized Cross Correlation (GCC), and the like, for AoA or distance estimations. To estimate AoA or distance, some embodiments can provide a number of phase values equal to the number of antennas. The RF signals used to estimate these phase values however are observed on antennas during different periods. Some estimating algorithms are designed to take as input phase values corresponding to RF signals observed on array of antennas approximately at the same time. FIG. 9 describes embodiments for adjusting and/or estimating phase values to provide the set of adjusted or estimated phase values as input to an estimating algorithm.

FIG. 9 is a graph diagram 900 illustrating a phase difference used to provide an adjusted or estimated phase value, in accordance with an embodiment. FIG. 9 shows the phase values of FIG. 8 for RF1 during period 810 and RF2 during period 820, as observed on antenna 1 305, antenna 2 315, and antenna 3 317. For example, at $t_1$, RF1 observed on antenna 1 305 has the phase value $\varphi 1_{ANT1}$ 814 and RF1 observed on antenna 2 315 has the phase value $\varphi 1_{ANT2}$ 816. At $t_2$, RF2 observed on antenna 1 305 has the phase value $\varphi 2_{ANT1}$ 824 and RF2 observed on antenna 3 317 has the phase value $\varphi 2_{ANT3}$ 826. At this point the phase values corresponding to antenna 1 305 and antenna 2 315 at t1 have been obtained for t1 but no phase value has been obtained that corresponds to antenna 3 317 at t1. The phase difference between the phase values at antenna 1 305 is shown as $\Delta \varphi_{t1\text{-}t2}$ 902. This difference represents the signal progression between t1 and t2. If it is assumed that whatever progression and corresponding phase difference observed on antenna 1 305 between t1 and t2 would have also been observed on antenna 3 317, then subtracting the phase difference $\Delta \varphi_{t1\text{-}t2}$ 902 from the phase value $\varphi 2_{ANT3}$ 826 on the antenna 3 at t2 will result in an estimated phase value $\varphi 1_{ANT3}$ EST 904 that would have existed at antenna 3 317 if RF1 were observed at antenna 3 317 at t1. In an embodiment, the direction and distance estimator 302 of FIG. 3 provides the adjustments and/or estimations described with respect to FIG. 9. This same technique can be used to provide adjusted phase values for any of the remaining N antennas. In this fashion, a set of adjusted and/or estimated phase values corresponding to a specific capture period can be provided as input to various estimation algorithms.

Figure 10:
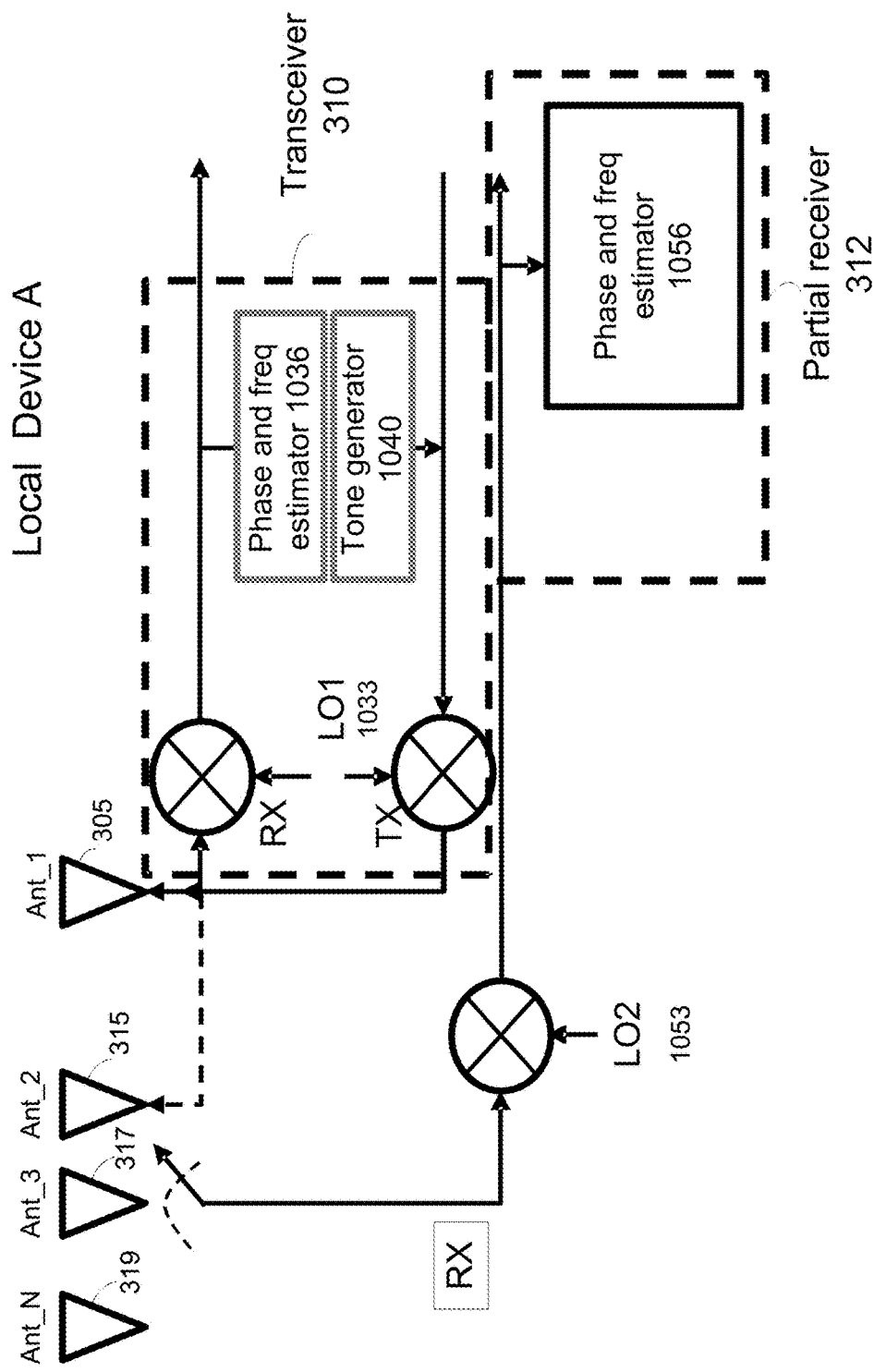
FIG. 10 is a block diagram illustrating a local device having a transceiver with one antenna and a partial receiver with multiple auxiliary antennas to provide extra angular information for the local device to estimate AoA of a target device based on an RF signal, in accordance with an embodiment.

FIG. 10 is a block diagram illustrating a local device having a transceiver 310 with one antenna and a partial receiver 312 with multiple auxiliary antennas to provide extra angular information for the local device to estimate AoA of a target device based on an RF signal, in accordance with an embodiment. The transceiver 310 and the partial receiver 312 may be from the wireless device 300 of FIG. 3.

Transceiver 310 may receive the RF signal through ant_1 305. The RF signal may be a constant tone ranging signal (e.g., unmodulated RF carrier) transmitted by the target device whose direction and/or distance is to be determined with respect to the local device. In some embodiments, the RF signal may be the modulated signal of a data packet. Transceiver 310 may down-convert the RF signal to an intermediate frequency (IF) signal by mixing the RF signal with a local oscillator signal LO1 1033 during the receiving time interval of a ranging cycle. One example of local oscillator signal LO1 1033 may be the local oscillator signal 433 of FIG. 4. A phase and frequency estimator 1036 may estimate the phase of the IF signal. Transceiver 310 may have a tone generator 1040 to generate a constant tone signal. Transceiver 310 may mix the constant tone signal with local oscillator signal LO1 1033 to up-convert the constant tone signal to a RF signal for transmission through ant_1 305 during a transmission time interval of the ranging cycle. Transceiver 310 may also transmit modulated signals to the target device in secure phase-based ranging applications or when establishing a data link with the target device, such as an LE asynchronous connection logical (ACL) transport in a Bluetooth network.

Partial receiver 312 may receive the RF signal through one of the auxiliary antennas ant_2 315, ant_3 317, . . . , ant_N 319 to provide extra angular information to estimate the AoA of the RF signal. Partial receiver 312 does not have a transmission capability and is only used during the receiving time interval of the ranging cycle to receive the constant tone RF signal. The received RF signal may be mixed with a local oscillator signal LO2 1053 to down-convert it to an IF signal. One example of local oscillator signal LO2 1053 may be the local oscillator signal 453 of FIG. 5. A phase and frequency estimator 1056 may estimate the phase of the IF signal received by partial receiver 312.

The difference between the phase of the IF signal from transceiver 310 and the phase of the IF signal from partial receiver 312 may be used to determine the AoA of the RF signal, such as by using equation 4. For example, a regulator such as the regulator 322 of FIG. 3 may determine the phase offset between the local oscillator LO1 1033 of transceiver 310 and the local oscillator LO2 1053 of partial receiver 312 so that the phase difference may be compensated for the AoA estimation. To determine the phase difference between the two local oscillators, a coupling circuit may couple the RF signal received by ant_1 305 to the receiver (Rx) path of the partial receiver 312 during a phase offset compensation interval of the ranging cycle. By coupling the RF signal from the same antenna to both transceiver 310 and partial receiver 312, the difference in the phase of the IF signals in transceiver 310 and partial receiver 312 after mixing with their respective LOs may be deduced as the phase offset between the two LOs.

Figure 11:
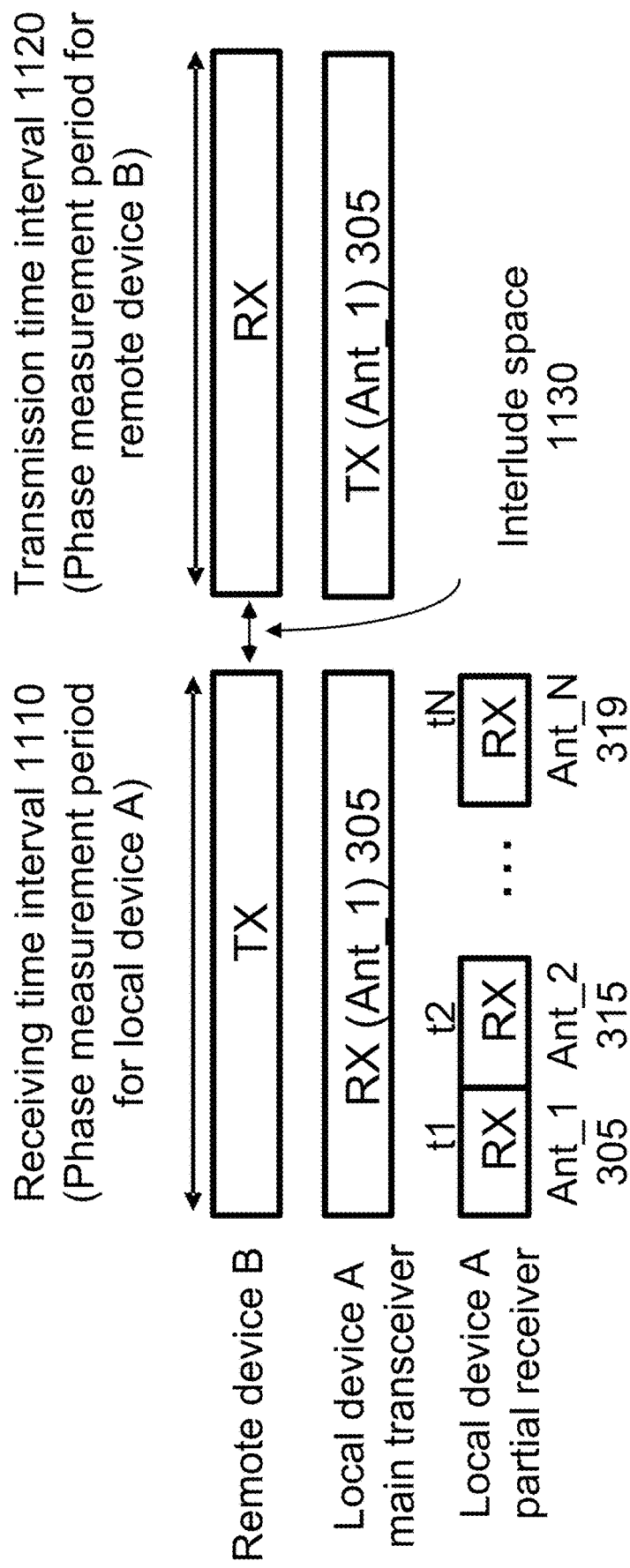
FIG. 11 depicts the transceiver with one antenna and the partial receiver switching among the multiple auxiliary antennas to receive the RF signal from the target device to make phase measurements for estimating the AoA or distance of the target device, in accordance with an embodiment.

FIG. 11 depicts the transceiver 310 with one antenna and the partial receiver 312 with multiple antennas switching among the multiple auxiliary antennas to receive the RF signal from the target device to make phase measurements for estimating the AoA or distance of the target device, in accordance with an embodiment. A phase exchange timeslot of a secure phase-based ranging cycle may be divided into a receiving time interval 1110 during which the local device (e.g., local device A) may receive a constant tone RF signal transmitted by the target device (e.g., remote device B), and a transmission time interval 1120 during which the local device may transmit a constant tone RF signal to the target device.

During a first time period t1 of the receiving time interval 1110, ant_1 305 may be coupled to the partial receiver 312 through a coupling circuit so that both the transceiver 310 and the partial receiver 312 receive the RF signal from the same antenna to determine the phase and frequency offset between the two local oscillators (e.g., LO1 1033 of transceiver 310 and LO2 1053 of partial receiver 312). A regulator may determine the phase and frequency offset by measuring the difference in the phase of the two IF signals over time period t1 after the RF signal from ant_1 305 has been mixed with their respective local oscillators.

At a second time period t2 of the receiving time interval 1110, the coupling circuit may switch to couple ant_2 315 to the partial receiver 312. The partial receiver 312 may then receive the RF signal through ant_2 315 while the transceiver 310 continues to receive the RF signal through ant_1 305. The transceiver 310 and the partial receiver 312 may measure the phases of their respective constant tone signals (e.g., by phase and frequency estimators 1036 and 1056) to determine their phase difference. At each subsequent time periods of the receiving time interval 1110, the coupling circuit may cycle through ant_3 317 through ant_N 319 to couple a different one of the auxiliary antennas to the partial receiver 312. The transceiver 310 continues to receive the RF signal through ant_1 305 through the receiving time interval 1110. The phase values measured using ant_1 305 may be used as a reference phase to determine the phase differences with the phase values measured using ant_2 315, ant_3 317, through ant_N 319. The phase differences may be compensated by the phase offset between the two local oscillators to determine the AoA of the RF signal or to determine the distance to the target device. In some embodiments, the phase values measured through the different antennas during the different time periods of the receiving time interval 1110 may be adjusted to a common time period as discussed in FIG. 9 when determining the phase differences with the reference phase of ant_1 305.

During the transmission time interval 1120 of the phase exchange timeslot, the transceiver 310 may transmit a constant tone RF signal through ant_1 305 to the target device. The partial receiver 312 may be idle during the transmission time interval 1120 as it does not have a transmit capability. The time periods t1, t2, ... tN of the receiving time interval 1110 may be collectively referred to as the phase measurement period for the local device. The transmission time interval 1120 may be used as the phase measurement period for the target device to measure the phase of constant tone RF signal transmitted through ant_1 305. There may be an interlude space 1130 between the receiving time interval 1110 and the transmission time interval 1120 to accommodate the antenna and RF switching delay of the transceiver 310. FIG. 11 shows the local device acting as a reflector to receive the constant tone signal first from the target device before transmitting a constant tone signal back to the target device in the phase-exchange time-slot. In other embodiments, the local device may act as an initiator to transmit a constant tone signal to the target device first and then receives a constant tone signal from the target device during the second part of the phase-exchange time-slot. In some embodiments when making the phase measurements to estimate the distance to the target device, the time-slot of FIG. 11 may be repeated at least twice for the local device and target device to exchange constant phase signals over at least two different channels.

Figure 12:
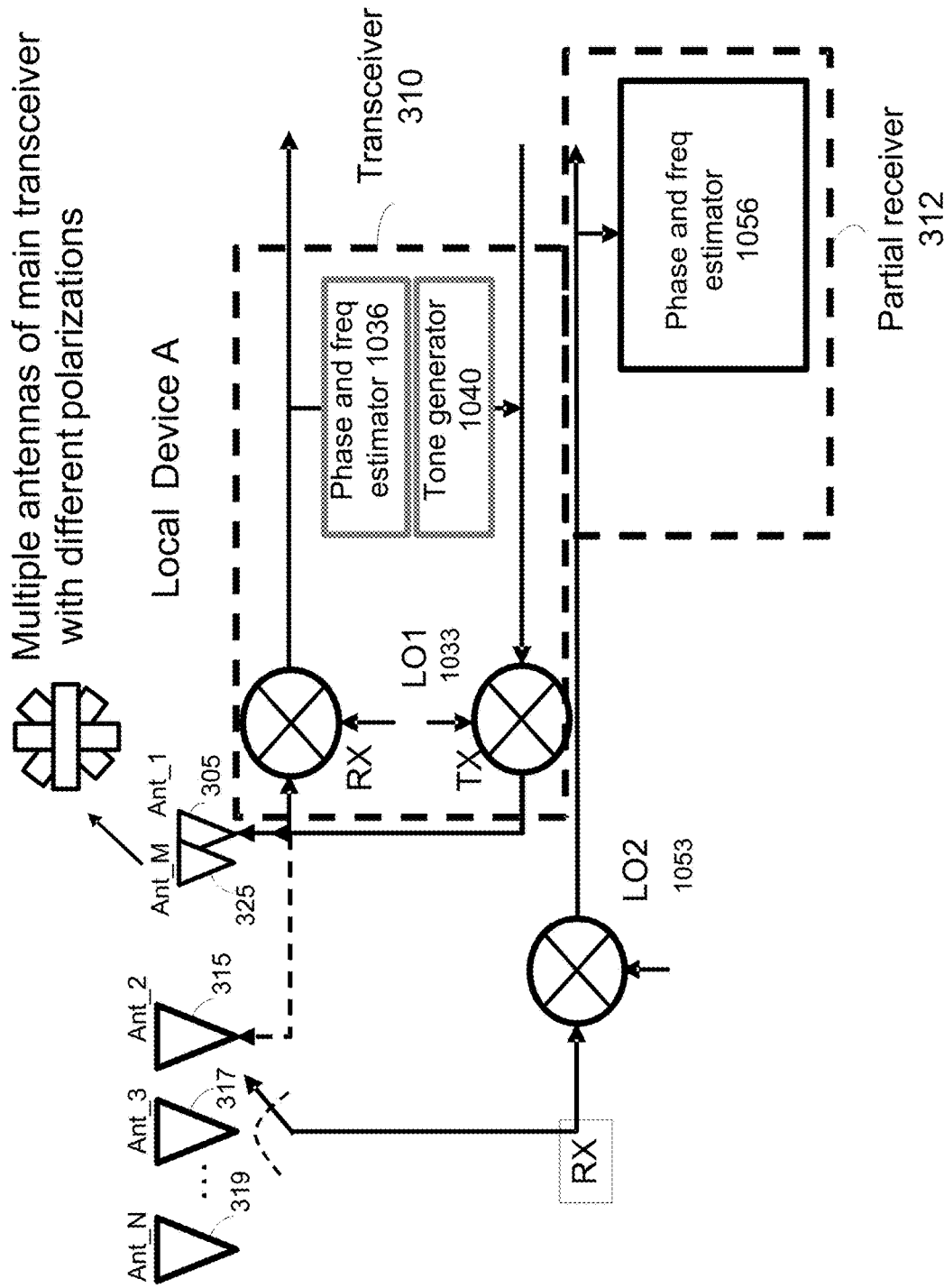
FIG. 12 is a block diagram illustrating a local device having a transceiver with multiple antennas of different polarizations to provide polarization diversity information to estimate the distance to a target device and a partial receiver with multiple auxiliary antennas to provide extra angular information to estimate AoA of the target device based on an RF signal, in accordance with an embodiment.

FIG. 12 is a block diagram illustrating a local device having a transceiver 310 with multiple antennas of different polarizations to provide polarization diversity information to estimate the distance to a target device and a partial receiver 312 with multiple auxiliary antennas to provide extra angular information to estimate AoA of the target device based on an RF signal, in accordance with an embodiment. The antennas of different polarizations, ant_1 305 through ant_M 325 may be used by the transceiver 310 to receive or transmit RF signals of different polarizations to improve the distance estimate to the target device but cannot provide angular information for AoA estimates. Instead, the auxiliary antennas of the partial receiver 312, ant_2 315, ant_3 317 through ant_N 319 may supply the extra angular information.

The transceiver 310 may be successively coupled to ant_1 305 through ant_M 325 to receive the RF signal through the different polarization antennas in successive receiving time intervals of a phase exchange timeslot. The phase and frequency estimator 1036 may estimate the phase of the IF signal at the output of the down-conversion mixer for the different polarization antennas. Due to possible frequency drift of the local oscillators, during each receiving time interval when the transceiver 310 dwells on a particular polarization antenna, a regulator may determine the phase offset between the local oscillator LO1 1033 of transceiver 310 and the local oscillator LO2 1053 of partial receiver 312 so that the phase difference may be compensated for the AoA or distance estimation. To accomplish this, a coupling circuit may couple the RF signal received by the polarization antenna of the transceiver 310 to the Rx path of the partial receiver 312 to deduce the phase offset between the two LOs. The coupling circuit may also couple ant_2 315, ant_3 317 through ant_N 319, to the Rx path of the partial receiver 312 for the phase and frequency estimator 1056 to estimate the phase of the IF signal received through the different auxiliary antennas.

Figure 13:
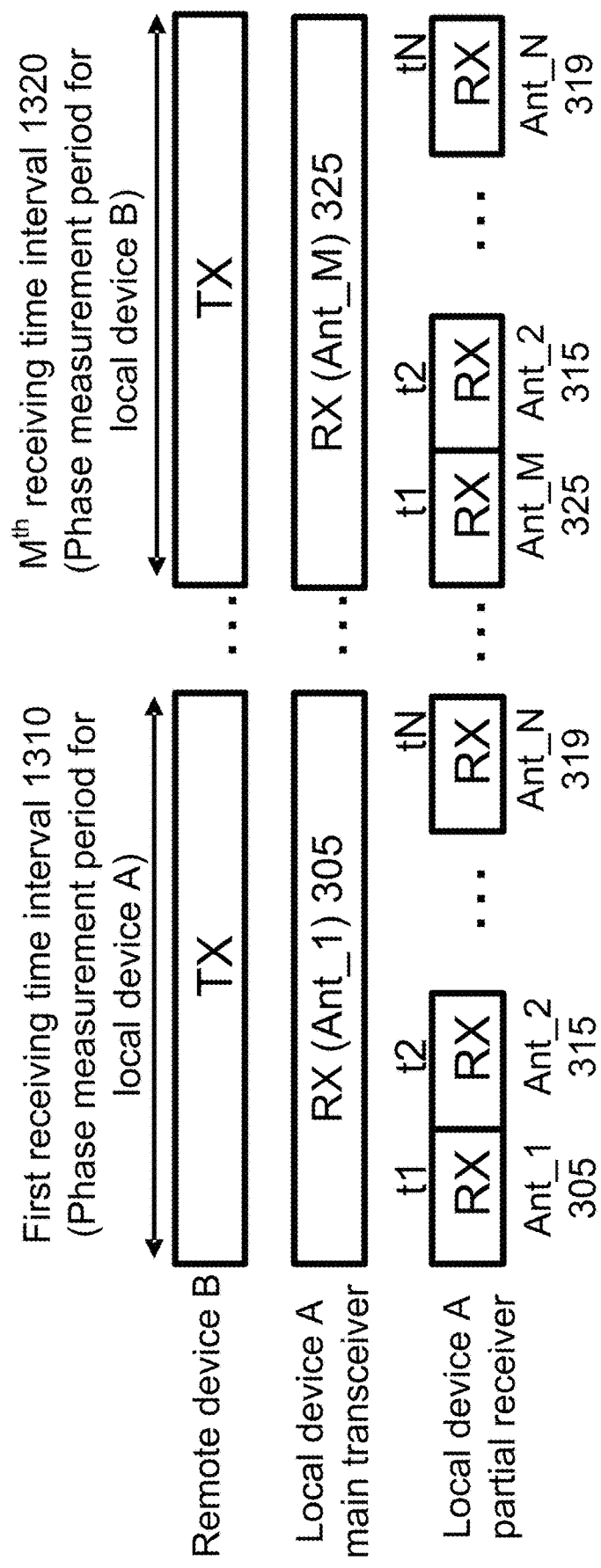
FIG. 13 depicts the transceiver switching among the multiple antennas of different polarizations and the partial receiver switching among the multiple auxiliary antennas to receive the RF signal from the target device to make phase measurements for estimating the AoA or distance of the target device, in accordance with an embodiment.

FIG. 13 depicts the transceiver 310 switching among the multiple antennas of different polarizations and the partial receiver 312 switching among the multiple auxiliary antennas to receive the RF signal from the target device to make phase measurements for estimating the AoA or distance of the target device, in accordance with an embodiment. There may be multiple receiving time intervals during the phase exchange timeslot. In each receiving interval, the transceiver 310 may be coupled to one of the polarization antennas, ant_1 305 through ant_M 325.

During a first time period t1 of each receiving time interval, the polarization antenna coupled to the transceiver 310 may also be coupled to the partial receiver 312 through a coupling circuit so that both the transceiver 310 and the partial receiver 312 receive the RF signal from the same antenna to determine the phase and frequency offset between the two local oscillators (e.g., LO1 1033 of transceiver 310 and LO2 1053 of partial receiver 312). For example, during t1 of a first receiving time interval 1310 when the transceiver 310 is receiving through ant_1 305, ant_1 305 is also coupled to the partial receiver 312. Analogously, during t1 of the $M^{th}$ receiving time interval 1320 when the transceiver 310 is receiving through ant_M 325, ant_M 325 is also coupled to the partial receiver 312. A regulator may determine the phase and frequency offset between the two LOs for each receiving time interval by measuring the difference in the phase of the two IF signals over the time period t1.

During each receiving time interval when the transceiver 310 dwells on a polarization antenna, the coupling circuit may successively couple different auxiliary antennas to the partial receiver 312 as in FIG. 11. The transceiver 310 and the partial receiver 312 may measure the phases of their respective constant tone signals to determine phase differences between the signals received through the polarization antenna and through each of the auxiliary antennas. The phase differences in each receiving time interval may be compensated by the phase offset between the two local oscillators measured during t1 of the same receiving time interval for each of the polarization antenna to determine the AoA of the RF signal or to determine the distance to the target device. In some embodiments, the partial receiver 312 may be part of a partial transceiver that includes a transmitter of reduced capability to transmit constant tone signals in synchronization with the tone generator 1040 of the transceiver 310. The transceiver 310 may transmit a constant tone signal successively through the polarization antennas ant_1 305 through ant_M 325 to the target device during a transmission time interval of the phase exchange time-slot (not shown). The phase exchange time-slot may be repeated at least twice for the local device and target device to exchange constant phase signals over at least two different channels when estimating the distance between the devices.

Figure 14:
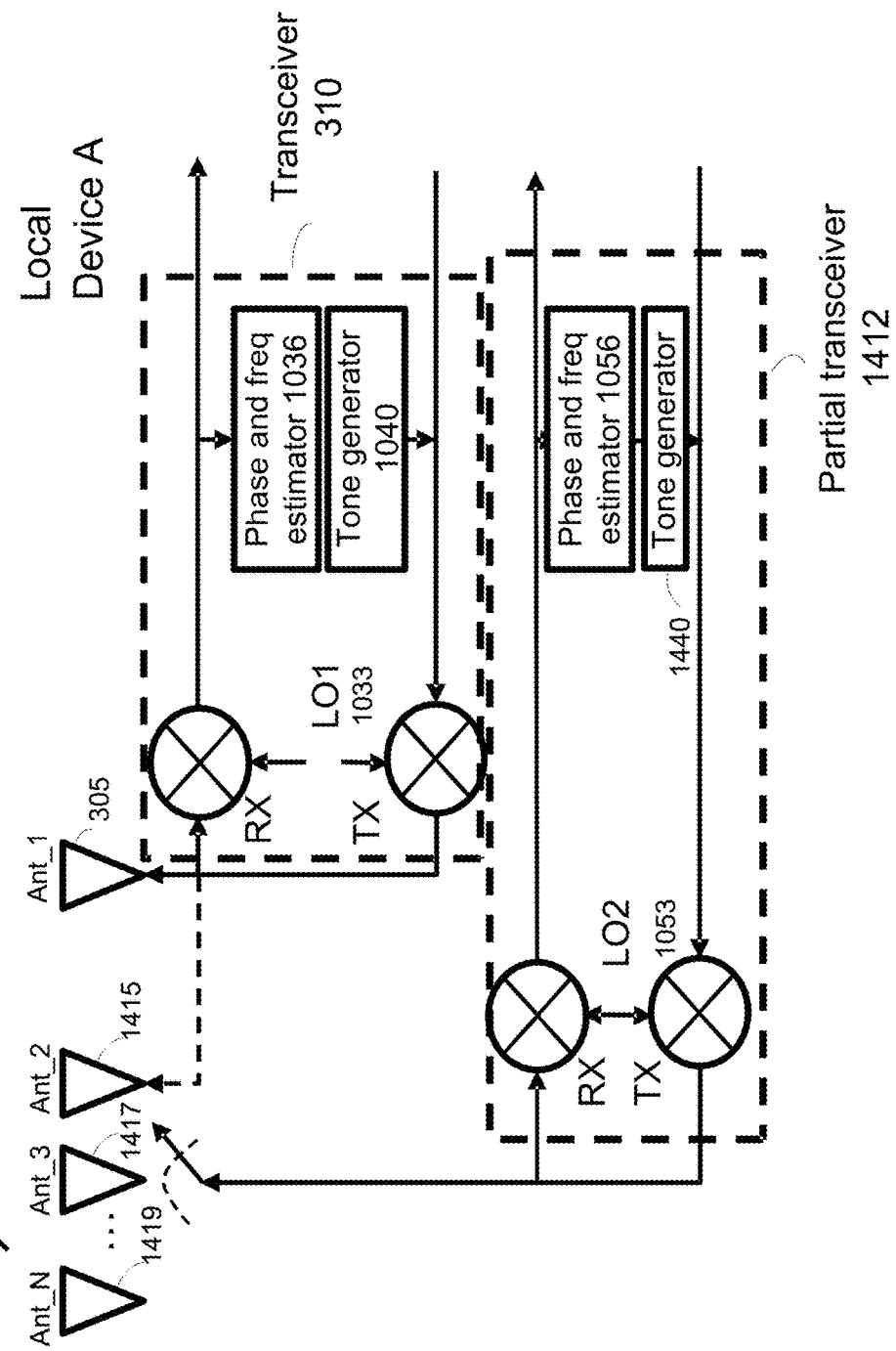
FIG. 14 is a block diagram illustrating a local device having a transceiver with one antenna and a partial transceiver with multiple auxiliary antennas of different polarizations for providing extra polarization diversity information to improve the estimate of the distance to the target device, in accordance with an embodiment.

FIG. 14 is a block diagram illustrating a local device having a transceiver 310 with one antenna and a partial transceiver 1412 with multiple auxiliary antennas of different polarizations for providing extra polarization diversity information to improve the estimate of the distance to the target device, in accordance with an embodiment.

The partial transceiver 1412 may only receive or transmit constant tone signals in synchronization with the main transceiver 310, but not modulated signals. In one aspect, during the receiving time interval of a phase exchange timeslot, the main transceiver 310 may receive the constant tone RF signal through ant_1 305 and the partial transceiver 1412 may be coupled successively to polarization antennas ant_2 1415, ant_3 1417 through ant_N 1419. The phase and frequency estimators 1036 and 1056 may measure the phases of the IF signals in the main transceiver 310 and the partial transceiver 1412, respectively. The local device may determine the phase difference between the signals measured through the ant_1 305 and those measured through each of the auxiliary polarization antennas. A regulator may regulate LO1 1033 of the transceiver 310 and LO2 1053 of the partial transceiver 1412 to compensate for the effect of the phase offset between the two LOs on the phase difference between the measured signals to determine the distance to the target device.

The partial transceiver 1412 has a tone generator 1440 to generate a constant tone signal similar to the tone generator 1040 of the transceiver 310. The regulator may regulate the two LOs to compensate for the effect of the phase offset between the LOs on the transmit (Tx) signals from the up-conversion mixers to synchronize the constant tone signals generated from the transceiver 310 and the partial transceiver 1412. During the transmission time interval of the phase exchange timeslot, the main transceiver 310 and the partial transceiver 1412 may successively transmit the constant tone signal to the target device using ant_1 305, ant_2 1415, ant_3 1417 through ant_N 1419.

Figure 15:
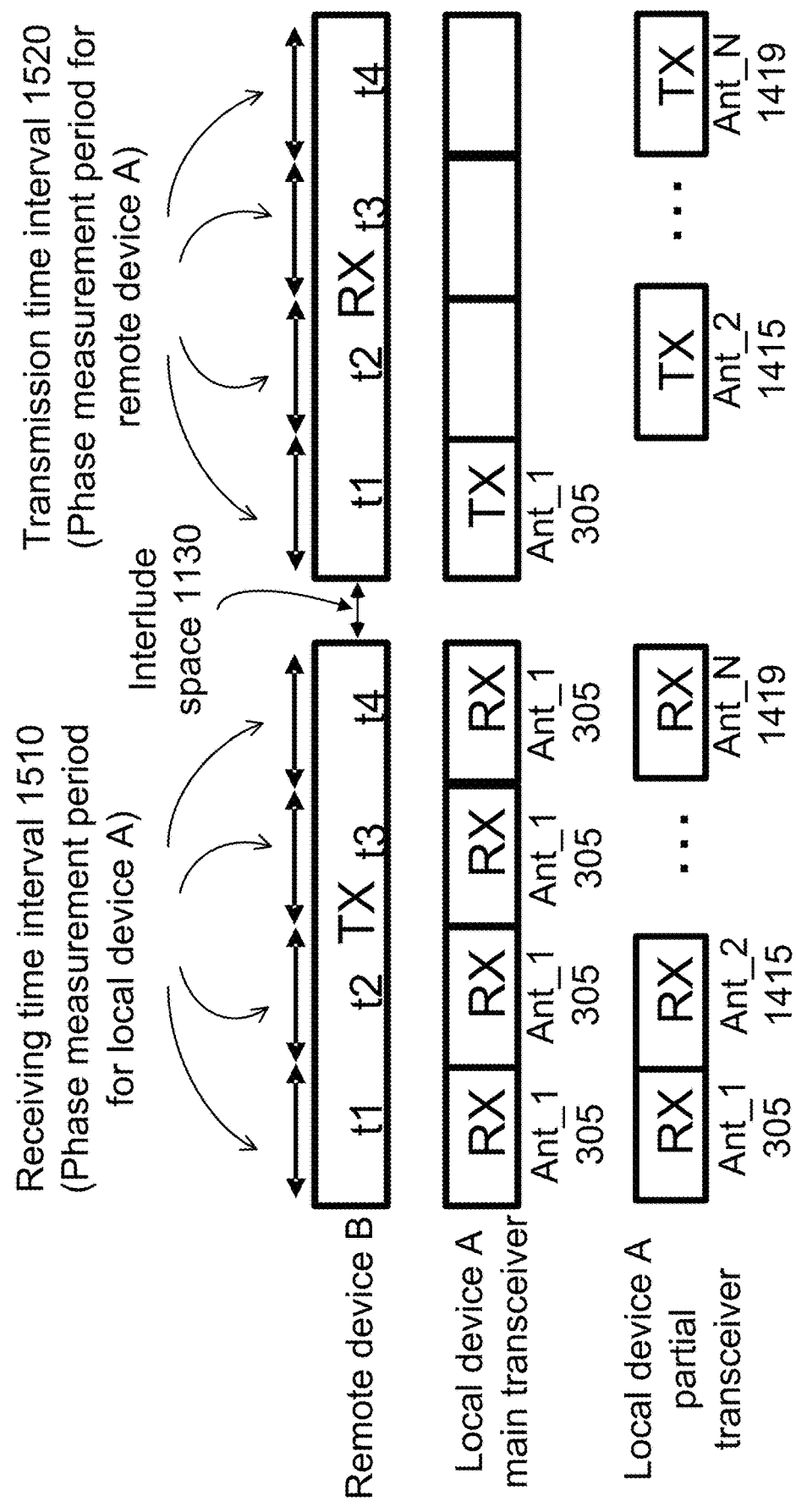
FIG. 15 depicts the transceiver with one antenna and the partial transceiver switching among the multiple auxiliary antennas with different polarizations to receive the RF signal from the target device and to transmit a constant tone to the target device, in accordance with an embodiment.

FIG. 15 depicts the transceiver 310 with one antenna and the partial transceiver 1412 switching among the multiple auxiliary antennas with different polarizations to receive the RF signal from the target device and to transmit a constant tone signal to the target device, in accordance with an embodiment. During the receiving time interval 1510 of the phase exchange timeslot, transceiver 310 may receive the RF signal through ant_1 305. Similar to FIG. 11, during a first time period t1 of the receiving time interval 1510, the partial transceiver 1412 may be coupled to ant_1 305 to allow the regulator to determine the phase and frequency offset between the two LOs. During successive time periods t2 through tN of the receiving time interval 1510, the partial transceiver 1412 may be coupled to ant_2 1415 through ant_N 1419 to determine the phase differences between the signals measured through ant_1 305 and those measured through ant_2 1415 through ant_N 1419 after compensating for the phase offset between the LOs.

During a first time period t1 of the transmission time interval 1520 of the phase exchange timeslot, the transceiver 310 may transmit the constant tone signal through ant_1 305 to the target device. During successive time periods t2 through tN of the transmission time interval 1520, the partial transceiver 1412 may be coupled to ant_2 1415 through ant_N 1419 to transmit the constant tone signal. The regulator may regulate the two LOs as a function of their phase offset to synchronize the constant tone signals generated from the transceiver 310 and the partial transceiver 1412. The auxiliary polarization antennas, ant_2 1415 through ant_N 1419, provide extra polarization diversity information in both the receive and transmit directions of the phase exchange timeslot to improve the estimate of the distance to the target device. Note that during the receiving time interval 1510 of the phase exchange timeslot, both the transceiver 310 and the partial transceiver 1412 may receive through their respective antennas, but during the transmission time interval 1520, only one antenna from either the transceiver 310 or the partial transceiver 1412 may transmit. The phase exchange time-slot may be repeated at least twice for the local device and target device to exchange constant phase signals over at least two different channels when estimating the distance between the devices.

Figure 16:
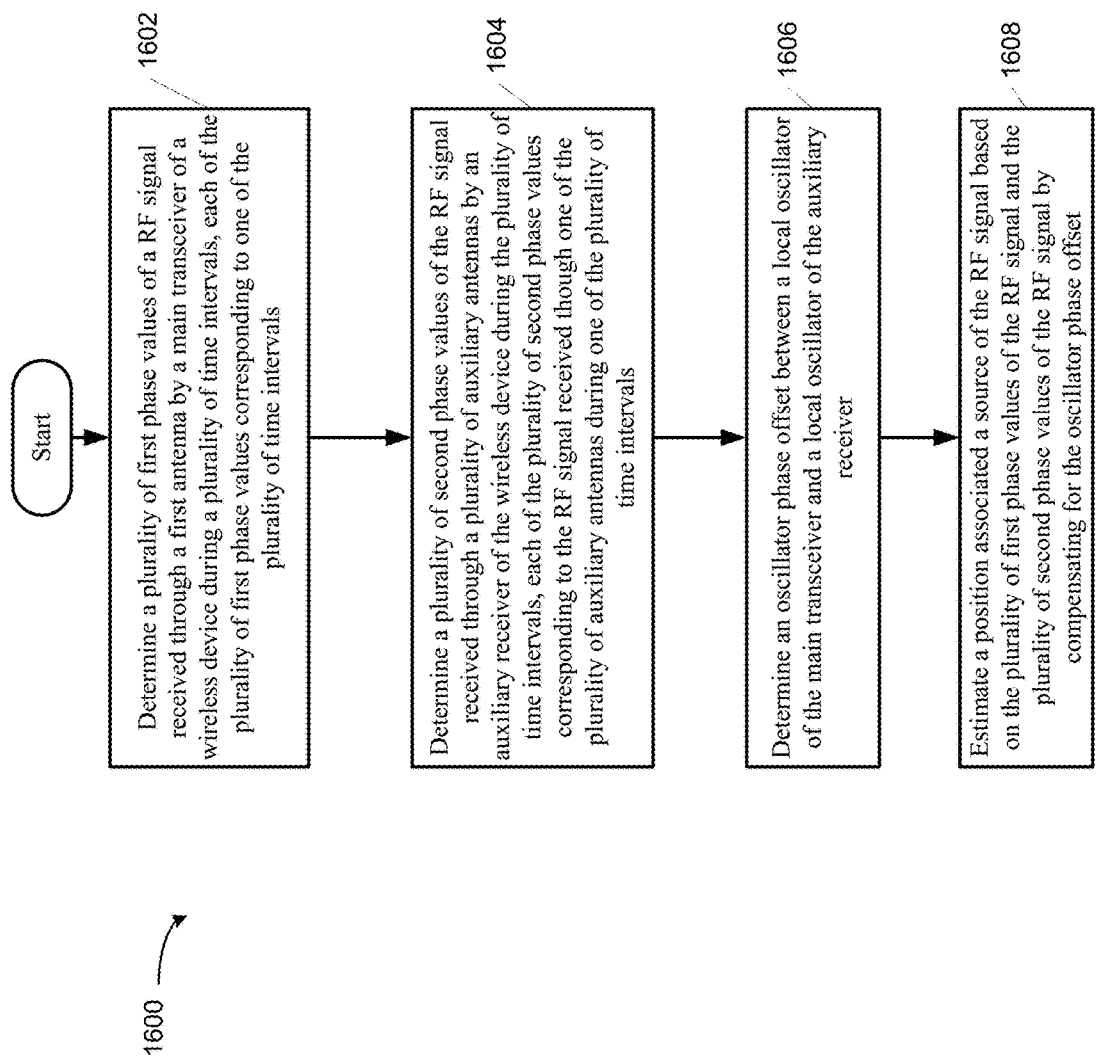
FIG. 16 is a flow diagram illustrating a method of estimating the position of a target device by a wireless device, in accordance with an embodiment

FIG. 16 is a flow diagram illustrating a method 1600 of estimating the position of a target device by a wireless device, in accordance with an embodiment. The method 1600 can be performed by processing logic comprising hardware (circuitry, dedicated logic, etc.), software (such as is run on a general purpose computing system or a dedicated machine), firmware (embedded software), or any combination thereof. In various embodiment, the method 1600 can performed by the wireless device of FIG. 3 for example, as further described with respect to FIGS. 4-7 and 10, 12, and 14.

At operation 1602, a main transceiver of a wireless device determines a plurality of first phase values of a RF signal received through a first antenna during a plurality of time intervals. Each of the plurality of phase values may correspond to one of the plurality of time intervals. The plurality of time intervals may constitute the receiving time interval of a phase exchange time-slot of a secure phase-based ranging cycle.

At operation 1604, an auxiliary receiver of the wireless device determines a plurality of second phase values of the RF signal received through a plurality of auxiliary antennas during the plurality of time intervals. Each of the plurality of second phase values may correspond to the RF signal received though one of the plurality of auxiliary antennas during one of the plurality of time intervals. The plurality of auxiliary antennas may provide extra angular information to improve the estimate of AoA of the RF signal from the target device. In some embodiments, the plurality of auxiliary antennas may have different polarizations to provide polarization diversity information to improve the estimate of the distance to a target device.

At operation 1606, the wireless device determines an oscillator phase offset between a local oscillator of the main transceiver and a local oscillator of the auxiliary receiver. The local oscillators of the main transceiver and the auxiliary receiver may be used to determine the plurality of first phase values of the RF signal received through the first antenna of the main transceiver and the plurality of second phase values of the RF signal received through the plurality of auxiliary antennas of the auxiliary receiver, respectively.

At operation 1608, the wireless device estimates a position associated with a source of the RF signal based on the plurality of first phase values of the RF signal and the plurality of second phase values of the RF signal by compensating for the oscillator phase offset. The wireless device may determine the position estimate based on the estimate of the AoA of the RF signal from the target device and the estimate of the distance of the target device.

Figure 17:
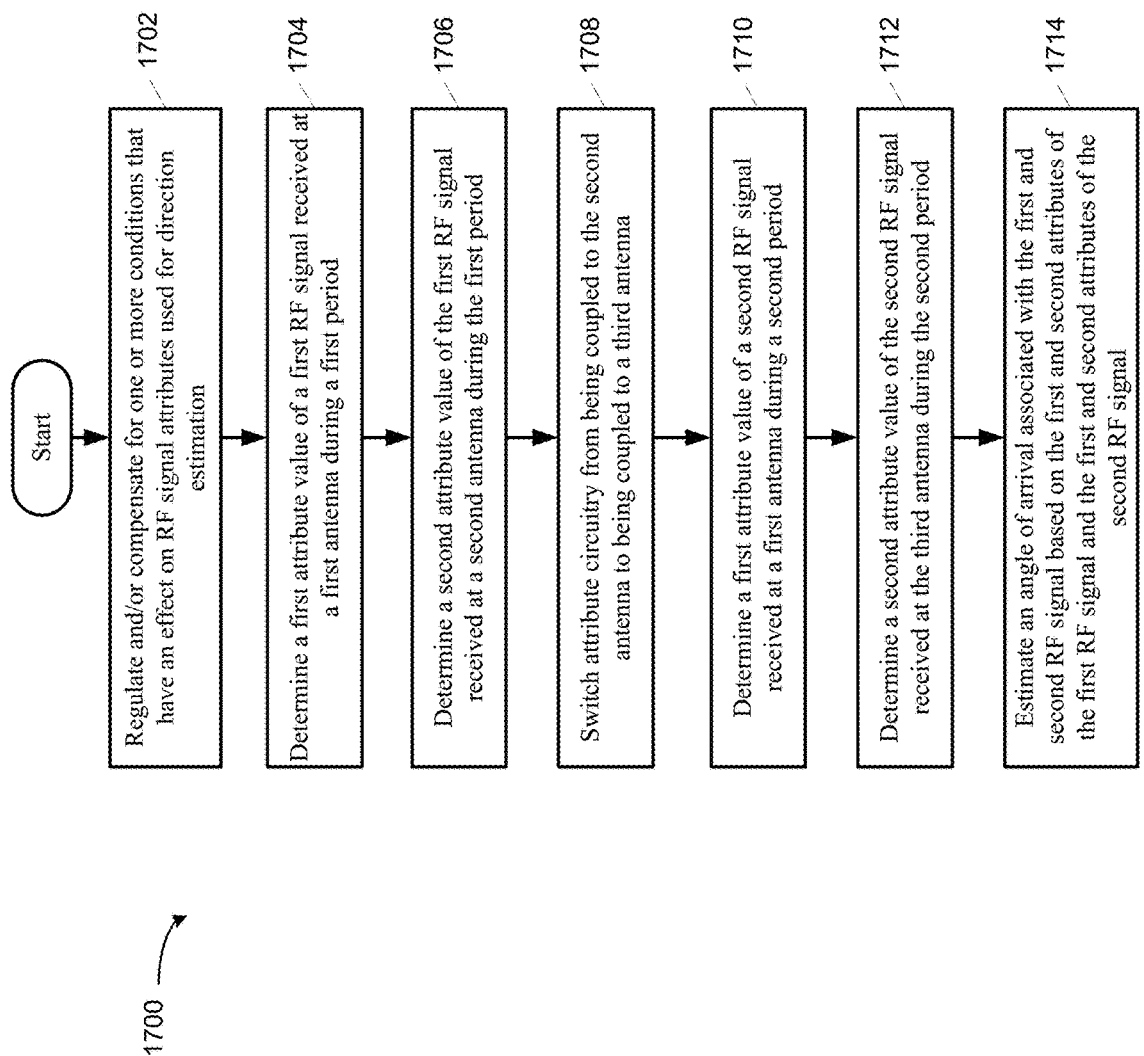
FIG. 17 is a flow diagram illustrating a method of estimating AoA by a wireless device, in accordance with another embodiment.

FIG. 17 is a flow diagram illustrating a method 1700 of estimating AoA, in accordance with an embodiment. The method 1000 can be performed by processing logic comprising hardware (circuitry, dedicated logic, etc.), software (such as is run on a general purpose computing system or a dedicated machine), firmware (embedded software), or any combination thereof. In various embodiment, the method 1700 can performed by the wireless device of FIG. 3 for example, as further described with respect to FIGS. 4-8 and 10.

For example, at block 1702 the regulator 322 of FIG. 3 regulates and/or compensates for one or more conditions that have an effect on RF signal attributes used for direction estimation. In some embodiments, the regulator 322 synchronizes to within a threshold range of synchronization a phase offset of the transceiver 310 (e.g., the receiver) with a phase offset of the partial receiver 312. Referring to the examples of FIGS. 4 and 5 the regulator 322 can regulate or synchronize the local oscillator signal 433 and 453 input to the first down-conversion mixer and the second down-conversion mixer to reduce an effect of phase offset on the estimate of the direction. Alternatively or additionally, the regulator 322 may determine a phase difference between the phase offset of the transceiver 310 and the phase offset of the partial receiver 312 (e.g., as described with respect to FIG. 3) to aid in compensating for the difference in AoA estimations.

At block 1704, the attribute estimator 320 of FIG. 3 determines a first attribute value of a first RF signal received at antenna 1 305 (e.g., a first antenna) during a first period. In an embodiment, the receiver 304 within the transceiver 310 of FIG. 3 includes the phase estimator 436 of FIG. 4 as an attribute estimator to provide the first phase value (e.g., 814) of the first RF signal received through a first antenna during a first period (e.g., 810) as illustrated in FIG. 8.

At block 1706, the attribute estimator 320 of FIG. 3 determines a second attribute value of the first RF signal received at a second antenna during the first period. For example, the receiver 312 of FIG. 3 may include the phase estimator 456 of FIG. 5 as its attribute estimator, and when coupled to antenna 2 315 through the switch circuitry 314 as shown in FIG. 6, the partial receiver 312 can provide a second phase value (e.g., 816) of the first RF signal received through the second antenna during the first period (e.g., 810) as illustrated in FIG. 8.

At block 1708, the switching circuitry 314 switches the attribute estimator (e.g., of the partial receiver 312) from being coupled to the second antenna to being coupled to a third antenna. For example, FIG. 7 shows the partial receiver 312 having been switched by the switching circuitry 314 from antenna 2 315 to antenna 3 317. The switching circuitry 314 is controllable by an input signal and may couple the partial receiver 312 to any of the 2-N antennas.

At block 1710, the attribute estimator 320 of FIG. 3 determines a first attribute value of a second RF signal received at a first antenna during a second period. Referring again to FIG. 4 the receiver 304 within the transceiver 310 of FIG. 3 includes the phase estimator 436 of FIG. 4 as the attribute estimator to provide the first phase value (e.g., 824) of the second RF signal received through the first antenna during the second period (e.g., 820) as illustrated in FIG. 8.

At block 1712 the attribute estimator 320 of FIG. 3 determines a second attribute value of the second RF signal received at the third antenna during the second period. For example, the partial receiver 312 of FIG. 3 may include the phase estimator 456 of FIG. 5 as its attribute estimator, and when coupled to antenna 3 317 through the switch circuitry 314 as shown in FIG. 7, the partial receiver 312 can provide a second phase value (e.g., 826) of the second RF signal received through the third antenna during the second period (e.g., 820) as illustrated in FIG. 8.

At block 1714, the direction and distance estimator 302 of FIG. 3 estimates an angle of arrival associated with the first and second RF signals based on the first and second attributes of the first RF signal and the first and second attributes of the second RF signal. In some embodiments, the direction and distance estimator 302 is implemented using the processing circuitry and estimates a direction of a source of the first and second RF signals relative to the antenna array, based on a first phase difference of the first RF signal between the first antenna and the second antenna and a second phase difference of the second RF signal between the first antenna and the third antenna.

In embodiments that estimate AoA using estimation algorithms, the direction and distance estimator 302 may further determine a phase difference between the first phase value of the first RF signal observed on the first antenna and the first phase value of the second RF signal observed on the first antenna, as illustrated and described with respect to FIG. 9. The direction and distance estimator 302 may then subtract this phase difference from the second phase value of the second RF signal observed on the third antenna to estimate a third phase value of the first RF signal received through the third antenna during the first period, as illustrated and described with respect to FIG. 9. In an embodiment, the direction and distance estimator 302 uses the phase values observed during the first period on antenna 1 305 and antenna 2 315 along with the estimated third phase value for antenna 3 317 during the first period in the estimation algorithm to estimate the angle of arrival.

In some embodiments, each RF signal may have a frequency within the ISM band and encode at least a portion of a Bluetooth packet, ZigBee packet, or Wi-Fi packet. For example, and not limitation, signals may be employed having characteristics that are compliant with Bluetooth low energy (BLE), Bluetooth basic range/enhanced data rate (BR/EDR), or Institute of Electrical and Electronics Engineers (IEEE) 802.11 and 802.15.4. A person having ordinary skill will understand that other embodiments may provide direction estimation for RF signals of any wireless communication spectra, modes of modulation, and/or communication protocols without departing from the inventive subject matter.

As discussed above some AoA or distance estimation solutions dedicate a different radio transceiver to each of its multiple antennas (e.g., multi-radio devices). For these devices, not only do the number of transceivers impact the BOM and footprint of the wireless device, but there is a linear relationship between the number of antennas and system complexity, which impacts power consumption. Other AoA estimation solutions use switching circuitry to couple a single transceiver (e.g., single-radio) to multiple antennas, one at a time, which compared to multi-radio solutions, can result in reduced BOM, footprint, complexity, and overall power consumption. In single-radio solutions, the RF signals are received through antennas at different times so determining the relevant phase differences (e.g. for AoA estimation) may rely on constant and/or predetermined RF signal modulation (e.g., incoming patterns) and time-based predictions of phase values to provide acceptable AoA estimations. Embodiments described herein can accurately estimate AoA or distance from the target device without the BOM, footprint, complexity and power consumption issues presented by multi-radio (e.g., dedicated transceiver per antenna) solutions and without a need for constant and/or predetermined incoming patterns or phase prediction used in of single radio solutions. Some non-limiting applications for AoA-based location finding using any RF signal are discussed with respect to FIG. 18.

Figure 18:
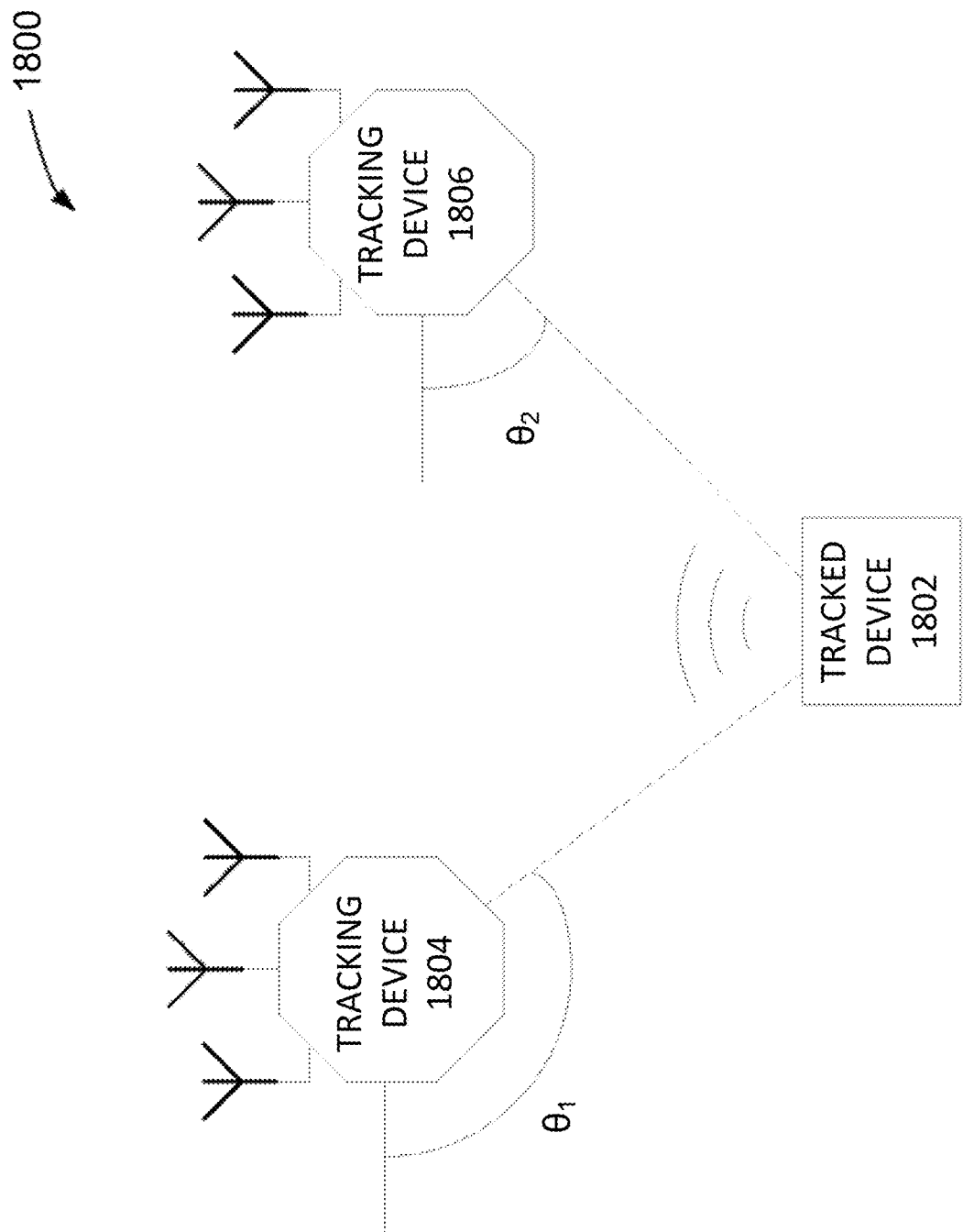
FIG. 18 is a block diagram illustrating an AoA estimation configuration applicable to various applications, in accordance with various embodiments.

FIG. 18 is a block diagram illustrating an AoA estimation configuration 1800 applicable to various applications, in accordance with embodiments. In embodiments, the tracked device 1802 includes at least one antenna (not shown) to transmit RF signals and the tracking devices 1804 and 1806 each include at least three antennas and use the systems and methods described herein to estimate an AoA or the range of the tracked device 1802. AoA estimations from the multiple tracking devices 1804 and 1806 and/or other information such as distance ranging or topology knowledge can be used (e.g., by any network node) to estimate two or three-dimensional location of the tracked device 1802. This capability may be used for, without limitation, warehouse/retail inventory tracking indoor location/navigational services, network efficiency, and home automation devices with location assistance.

For example, some smart lighting systems utilize ZigBee PAN protocol between its hub and the lightbulbs. The set-up process may include assignment of each bulb ID with specific location (e.g., the hall, the bedroom, etc.). While currently this process is manual, with location tracking enabled, it can be semi-fully automated. Embodiments may be implemented in control hub device(s) (e.g., the tracking devices 1804 and 1806) to identify the direction to each lightbulb (e.g., the tracked device 1802). In embodiments, coordinate location of the lightbulbs can be achieved through techniques known by those having ordinary skill in the art such as distance finding, trilateration, indoor mapping information, and triangulation using multiple tracking devices.

Since the embodiments described herein can estimate AoA based on any incoming pattern (e.g., protocol and pattern independent), the functionality can be enabled in tracking devices (e.g., tracking devices 1804 and 1806) so that both AoA aware devices (e.g. those that provide a predetermined pattern to the tracker for AoA estimation) and AoA unaware devices in the PAN network can be located. The AoA-based tracking devices 1804 and 1806 will work with the existing PAN installment base (e.g., AoA unaware legacy devices) while maintaining low complexity (e.g., some embodiments only add a partial receiver and a switch) of the PAN solutions. One having ordinary skill in the art would recognize that some embodiments described herein may be used in network devices not explicitly designated as PAN devices Embodiments for tracking of AoA unaware devices can be applied to mesh network management. When embodiments are used to gain a knowledge of physical topology of the mesh elements—management, diagnostic, and use applications can be extended or developed involving AoA unaware devices. For example, directional transmission can be used for congestion reduction. Once AoA of a tracked device 1802 is established, a tracking device (e.g., 1804) with an ability to direct its or the tracked device's signals, can cause itself or the tracked device to limit the range of signal broadcast to reduce interference to the neighboring networks. This may be implemented using known beamforming techniques or through the use of directional antennas.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method of operations by a wireless device, the method comprising:
   using a main transceiver of the wireless device, determining a plurality of first phase values of a radio frequency (RF) signal received through a first antenna during a plurality of time intervals, each of the plurality of first phase values corresponding to one of the plurality of time intervals;
   using an auxiliary receiver of the wireless device, determining a plurality of second phase values of the RF signal received through a plurality of auxiliary antennas during the plurality of time intervals, each of the plurality of second phase values corresponding to the RF signal received though one of the plurality of auxiliary antennas during one of the plurality of time intervals;
   determining an oscillator phase offset between a local oscillator of the main transceiver and a local oscillator of the auxiliary receiver; and
   estimating a position associated with a source of the RF signal based on the plurality of first phase values of the RF signal and the plurality of second phase values of the RF signal by compensating for the oscillator phase offset.

2. The method of claim 1, wherein estimating the position comprises:
   determining phase differences between each of the plurality of first phase values and a corresponding one of the second phase values while compensating for an effect of the oscillator phase offset on the phase difference to estimate an angle of arrival of the RF signal or a distance to the source of the RF signal.

3. The method of claim 1, wherein determining the oscillator phase offset comprises:
   coupling concurrently the RF signal received through the first antenna to the auxiliary receiver for one of the plurality of time intervals when the main transceiver is receiving the RF signal through the first antenna;
   mixing the RF signal with the local oscillator of the main transceiver to generate a first intermediate frequency (IF) signal;
   mixing the RF signal with the local oscillator of the auxiliary receiver to generate a second intermediate IF signal; and
   determining the oscillator phase offset as a difference in phase values between the first IF signal and the second IF signal.

4. The method of claim 1, wherein determining the plurality of second phase values of the RF signal received through the plurality of auxiliary antennas comprise:
   coupling the RF signal received through successive ones of the plurality of auxiliary antennas to the auxiliary receiver during successive ones of the plurality of time intervals.

5. The method of claim 1, further comprising:
   regulating the local oscillator of the main transceiver and the local oscillator of the auxiliary receiver to maintain the oscillator phase offset within a predetermined range during the plurality of time intervals.

6. The method of claim 1, wherein the first antenna is one of a plurality of main antennas of different polarizations, and wherein determining the oscillator phase offset comprises:
   coupling concurrently the RF signal received through each of the plurality of main antennas of different polarizations to the main transceiver and the auxiliary receiver;
   mixing the RF signal with the local oscillator of the main transceiver to generate a first intermediate frequency (IF) signal;
   mixing the RF signal with the local oscillator of the auxiliary transceiver to generate a second intermediate IF signal; and
   determining the oscillator phase offset as a difference in phase values between the first IF signal and the second IF signal corresponding to each of the plurality of main antennas of different polarizations.

7. The method of claim 6, further comprising:
   using the main transceiver, for each of the plurality of main antennas of different polarizations, determining a plurality of first phase values of the RF signal received through a corresponding one of the main antennas;
   using the auxiliary receiver, determining a plurality of second phase values of the RF signal received through the plurality of auxiliary antennas during a plurality of time intervals when the main transceiver is receiving the RF signal through said main antennas, each of the plurality of second phase values corresponding to the RF signal received though one of the plurality of auxiliary antennas during one of the plurality of time intervals; and
   estimating an angle of arrival associated with the RF signal or a distance to the source of the RF signal based on the plurality of first phase values of the RF signal received through said main antenna and the plurality of second phase values of the RF signal received through the plurality of auxiliary antennas when the main transceiver is receiving the RF signal through said main antenna, and compensating for an effect of the oscillator phase offset corresponding to said main antenna on the angle of arrival or the distance estimates.

8. The method of claim 1, wherein the plurality of auxiliary antennas comprises antennas of different polarizations and wherein the auxiliary receiver is part of an auxiliary transceiver.

9. The method of claim 8, further comprising:
   transmitting a first signal of a constant tone by the main transceiver through the first antenna; and
   transmitting a second signal of the constant tone by the auxiliary transceiver through each of the plurality of auxiliary antennas of different polarizations in synchronization with transmitting the first signal by the main transceiver.

10. The method of claim 9, further comprising:
   compensating for an effect of the oscillator phase offset on phase values of the first signal and the second signal.

11. An apparatus comprising:
   a main transceiver configured to be coupled to a first antenna to receive a radio frequency (RF) signal during a plurality of time intervals to determine a plurality of first phase values of the RF signal using a first local oscillator of the main transceiver, each of the plurality of first phase values corresponding to one of the plurality of time intervals;
   an auxiliary receiver configured to be coupled to a plurality of auxiliary antennas to receive the RF signal during the plurality of time intervals to determine a plurality of second phase values of the RF signal using a second local oscillator of the auxiliary receiver, each of the plurality of second phase values corresponding to the RF signal received though one of the plurality of auxiliary antennas during one of the plurality of time intervals;

a regulator configured to determine an oscillator phase offset between the first local oscillator of the main transceiver and the second local oscillator of the auxiliary receiver; and a direction estimator configured to estimate a position associated with a source of the RF signal based on the plurality of first phase values of the RF signal and the plurality of second phase values of the RF signal, wherein the direction estimator is configured to compensate for the oscillator phase offset to estimate the position.

12. The apparatus of claim 11, wherein the direction estimator is configured to:

determine phase differences between each of the plurality of first phase values and a corresponding one of the second phase values; and compensate the phase differences for an effect of the oscillator phase offset to estimate an angle of arrival of the RF signal or a distance to the source of the RF signal.

13. The apparatus of claim 11, wherein:

the main transceiver is configured to mix the RF signal using the first local oscillator to generate a first intermediate frequency (IF) signal;

the auxiliary receiver is configured to be concurrently coupled to the first antenna to receive the RF signal for one of the plurality of time intervals when the main transceiver is coupled to the first antenna and to mix the RF signal using the second local oscillator to generate a second IF signal; and the regulator is configured to determine the oscillator phase offset as a difference in phase values between the first IF signal and the second IF signal.

14. The apparatus of claim 11, wherein the first antenna is one of a plurality of main antennas of different polarizations, and wherein:

the main transceiver is configured to be coupled to each of the plurality of main antennas to receive the RF signal through a corresponding one of the main antennas over a plurality of time intervals to determine a plurality of first phase values of the RF signal using the first local oscillator of the main transceiver;

the auxiliary receiver is configured to be coupled to the plurality of auxiliary antennas to receive the RF signal during the plurality of time intervals when the main transceiver is coupled to said main antenna to determine a plurality of second phase values of the RF signal using the second local oscillator of the auxiliary receiver, each of the plurality of second phase values corresponding to the RF signal received though one of the plurality of auxiliary antennas during one of the plurality of time intervals; and the regulator is configured to compensate for the oscillator phase offset corresponding to said main antenna to estimate an angle of arrival associated with the RF signal or a distance to the source of the RF signal based on the plurality of first phase values of the RF signal received through said main antenna and the plurality of second phase values of the RF signal received through the plurality of auxiliary antennas when the main transceiver is coupled to said main antenna.

15. The apparatus of claim 11, wherein the plurality of auxiliary antennas comprises antennas of different polarizations and wherein the auxiliary receiver is part of an auxiliary transceiver.

16. The apparatus of claim 15, wherein:

the main transceiver is configured to transmit a first signal of a constant tone through the first antenna;

the auxiliary transceiver is configured to transmit a second signal of the constant tone through each of the plurality of auxiliary antennas of different polarizations in synchronization with transmissions of the first signal by the main transceiver; and the regulator is configured to compensate for an effect of the oscillator phase offset on phase values of the first signal and the second signal.

17. A wireless device comprising:

an antenna array including one or more main antennas and a plurality of auxiliary antennas;

a first receiver coupled to a first antenna of the main antennas and to a first local oscillator over a plurality of time intervals to receive a radio frequency (RF) signal from the first antenna for down-conversion using the first local oscillator to determine a plurality of first phase values of the RF signal, each of the plurality of first phase values corresponding to one of the plurality of time intervals;

a coupling circuit configured to switch one of main antennas or one of the plurality of auxiliary antennas to an auxiliary receive path;

a second receiver coupled to the auxiliary receive path and to a second local oscillator during the plurality of time intervals to receive the RF signal from the plurality of auxiliary antennas for down-conversion using the second local oscillator to determine a plurality of second phase values of the RF signal, each of the plurality of second phase values corresponding to the RF signal received though one of the plurality of auxiliary antennas during one of the plurality of time intervals;

a regulator configured to determine an oscillator phase offset between the first local oscillator and the second local oscillator; and a processor configured to compensate for an effect of the oscillator phase offset on the plurality of first phase values of the RF signal and on the plurality of second phase values of the RF signal to estimate a position associated with a source of the RF signal.

18. The wireless device of claim 17, wherein:

the first receiver is configured to down-convert the RF signal received from the first antenna using the first local oscillator to generate a first intermediate frequency (IF) signal;

the coupling circuit is configured to switch the first antenna to the auxiliary receive path for one of the plurality of time intervals when the first receiver is coupled to the first antenna;

the second receiver is configured to down-convert the RF signal received from the first antenna using the second local oscillator to generate a second IF signal; and the regulator is configured to determine the oscillator phase offset as a difference in phase values between the first IF signal and the second IF signal; and the processor is configured to:

determine phase differences between each of the plurality of first phase values and a corresponding one of the second phase values; and compensate the phase differences for the oscillator phase offset.

19. The wireless device of claim 17, wherein the main antennas comprise a plurality of main antennas of different polarizations; and wherein:
the first receiver is coupled to each of the plurality of main antennas of different polarizations to receive the RF signal through a corresponding one of the main antennas over a plurality of time intervals for down-conversion using the first local oscillator to determine a plurality of first phase values of the RF signal;
the second receive is coupled to the auxiliary receive path to receive the RF signal from the plurality of auxiliary antennas to receive the RF signal for down-conversion to determine a plurality of second phase values of the RF signal during the plurality of time intervals when the first transceiver is coupled to said main antenna, each of the plurality of second phase values corresponding to the RF signal received though one of the plurality of auxiliary antennas during one of the plurality of time intervals; and
the processor is configured to compensate for an effect of the oscillator phase offset corresponding to said main antenna on the plurality of first phase values of the RF signal received through said main antenna and on the plurality of second phase values of the RF signal received through the plurality of auxiliary antennas when the first transceiver is coupled to said main antenna to estimate an angle of arrival associated with the RF signal or a distance to the source of the RF signal.

20. The wireless device of claim 17, wherein the plurality of auxiliary antennas comprises antennas of different polarizations, and wherein:
the first receiver is configured to transmit a first signal of a constant tone through the first antenna using a first tone generator;
the second receiver is configured to transmit a second signal of the constant tone through each of the plurality of auxiliary antennas of different polarizations using a second tone generator in synchronization with transmissions of the first signal by the first transceiver; and
the regulator is configured to compensate for an effect of the oscillator phase offset on phase values of the first signal and the second signal.

\* \* \* \* \*